(12) United States Patent
Kawasaki

(10) Patent No.: US 6,364,230 B1
(45) Date of Patent: Apr. 2, 2002

(54) DUAL-BEARING REEL CENTRIFUGAL BRAKING DEVICE

(75) Inventor: Ken'ichi Kawasaki, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/621,820

(22) Filed: Jul. 21, 2000

(30) Foreign Application Priority Data

| Jul. 26, 1999 | (JP) | 11-210844 |
| Oct. 19, 1999 | (JP) | 11-296574 |
| Oct. 19, 1999 | (JP) | 11-296575 |
| Nov. 4, 1999 | (JP) | 11-313561 |

(51) Int. Cl.$^7$ ............................................. A01K 89/02
(52) U.S. Cl. ..................... 242/289; 188/181 A; 188/185
(58) Field of Search .................. 242/289; 188/185, 188/187, 181 A

(56) References Cited

U.S. PATENT DOCUMENTS

| 4,390,140 A | * | 6/1983 | Karlsson et al. | 242/289 |
| 5,308,021 A | * | 5/1994 | Ikuta | 242/289 |
| 5,356,090 A | * | 10/1994 | Sato | 242/289 |
| 5,362,011 A | * | 11/1994 | Sato | 242/289 |
| 5,393,005 A | * | 2/1995 | Nakajima | 242/289 |
| 5,803,385 A | * | 9/1998 | Baisch | 242/289 |
| 5,865,387 A | * | 2/1999 | Hirano | 242/289 |
| 5,950,949 A | * | 9/1999 | Cockerham | 242/289 |
| 5,984,221 A | * | 11/1999 | Kim | 242/289 |
| 5,996,921 A | * | 12/1999 | Hogaki et al. | 242/289 |
| 6,003,798 A | * | 12/1999 | Kim | 242/289 |
| 6,168,106 B1 | * | 1/2001 | Cockerham | 242/289 |
| 6,196,485 B1 | * | 3/2001 | Sato | 242/289 |
| 6,254,021 B1 | * | 7/2001 | Morimoto et al. | 242/289 |

* cited by examiner

Primary Examiner—Emmanuel M. Marcelo
(74) Attorney, Agent, or Firm—Shinjyu Global IP Counselors, LLP

(57) ABSTRACT

A dual-bearing reel-braking device for minutely adjusting braking force and enabling alteration of braking-force adjustment ranges. The dual-bearing reel centrifugal braking mechanism brakes the spool under centrifugal force, and includes a cylindrical brake element, a plurality of shifters, a switching mechanism, and a shifting mechanism. The brake element is fitted non-rotatably in the reel unit and allowed to shift in the spool axial direction. The shifters are fitted to a plurality of guide shafts on which the shifters are allowed to shift, stood radially on the rotary member, which is coupled with the spool. Differing numbers of the shifters are brought into contact with the brake element by shifting the brake element axially. The switching mechanism switches the posture of the shifters between an inoperative posture in which they cannot contact the brake element, and an operative posture in which they can, by changing the positions of the shifters. The shifting mechanism shifts the brake element axially.

32 Claims, 22 Drawing Sheets

DUAL-BEARING REEL CENTRIFUGAL BRAKING DEVICE

BACKGROUND OF THE INVENTION

1. Technical Field

The present invention relates to reel-braking devices; in particular to dual-bearing reel centrifugal braking devices for braking the spool rotatively provided in the reel unit.

2. Description of Related Art

In dual-bearing reels referred to as a bait reels, utilized mainly for lure fishing, generally braking force is made to act on the spool so that backlash, wherein the rotational speed of the spool when casting is faster than the line wind-out speed, does not occur. Centrifugal braking devices that employ centrifugal force developing from spool rotation to brake the spool are an example of this type of braking mechanism.

Japanese Utility Model Gazette Reg. No. 2588000 discloses a centrifugal braking mechanism of a braking device of this type in which its braking force is adjustable from outside of a reel body.

The above centrifugal braking mechanism includes two guide shafts, four shifters, a brake element, and a shifting mechanism. The two guide shafts penetrate through the spool shaft in the radius direction and are fixed to different positions of the spool shaft in the axial direction. The four shifters are attached to both ends of each of the guide shafts in a movable manner in the axial direction. The brake element is non-rotatably provided in the reel body in a movable manner in the spool axial direction. The shifting mechanism moves the brake element in the spool axial direction. The brake element is a cylindrical member that is disposed outer periphery side of the shifters. The shifting mechanism is a mechanism that may be operated from outside of the reel.

In the above-mentioned conventional centrifugal braking mechanism, the shifters are moved outwardly in the spool axial direction, when the spool rotates, due to the centrifugal force applied to the shifters which are attached to the guide shafts. The shifters then make contact with the brake element to brake the spool. When the brake element is moved in the axial direction by an operation of the shifting mechanism from outside of the reel, the number of the shifters which make contact with the brake element is changed to adjust the braking force.

In the foregoing conventional centrifugal braking device, since the guide shafts are provided penetrating the spool shaft, the positions of the two guide shafts in the spool axial direction have to be apart by the guide shaft diameter or more. Therefore, the brake element must be shifted the guide shaft diameter or more in the spool axial direction to change the braking force; and it is difficult to make delicate adjustments to braking force that depends on different numbers of guide shafts in the axial direction.

Moreover, the braking force adjustment ranges are restricted to the range from the maximum braking state in which all of the shifters fitted on the guide shafts make contact with the brake element, to the minimal braking state in which only one shifter fitted on a guide shaft makes contact with the brake element, which fixes the ranges of adjustment. For example, in the earlier noted conventional configuration, wherein the number of the spool-shaft-penetrating guide shafts is two, the braking force can only be adjusted in ranges at two stage: a maximum braking state in which four shifters make contact and an initial braking state in which two shifters make contact. Thus, the braking force cannot be adjusted finely, which at the same time freezes the braking force adjustment range.

SUMMARY OF THE INVENTION

An object of the present invention is to enable fine adjustment of braking force in a braking device for a dual-bearing reel.

Another object of the present invention is to make it so that braking force adjustment ranges can be altered in the braking device for a dual-bearing reel.

A separate object of the present invention is to prevent mis-assembly of the plurality of shifters of differing braking characteristics in a dual-bearing reel thus equipped.

The centrifugal braking device for a dual-bearing reel in a first aspect of the present invention is a device for braking a spool which is rotatably fitted to the reel body and includes a brake element, a rotary member, a plurality of shifters, and a shifting mechanism. The brake element is a cylindrically shaped member whose rotation is restricted with respect to the reel body. The rotary member is a member that rotates together with the spool and is relatively movable in the rotational axis direction of the spool with respect to the brake element. The shifters are members each of which is movably attached to the rotary member and moved towards the brake element by a centrifugal force generated by a rotation of the spool. The shifters are capable of making contact with the brake element with a different number thereof due to the relative movement of the rotary member in the rotational axis direction to the brake element. The shifting mechanism is a mechanism for relatively moving the brake element and the rotary member in the rotational axis direction.

In this centrifugal braking device, for instance, when the brake element is moved in the rotational axis direction, the number of the shifters which make contact with the brake element is changed due to the movement of the brake element in the axial direction and, hence, the braking force may be adjusted.

Herein, the shifters are attached to the rotary member which rotates together with the spool, and not to the guide shaft which penetrates the spool shaft. For this reason, a delicate adjustment of the braking force may be achieved since the shifters may be shifted more minutely when the shifters are disposed so as to be shifted in the rotational axis direction. Also, it is possible not only to vary the number of the shifters that make contact with the brake element by changing the position of the shifters in the rotational axis direction but also to change only the position of the shifters in the axial direction at which they make contact with the brake element.

Herein, the braking force may further be adjusted more minutely not depending on the position of the shifters in the rotational axis direction.

The centrifugal braking device for a dual-bearing reel in a second aspect of the present invention is a device as set forth in the first aspect, but further comprising a switching means for changing a state of at least one of the plurality of shifters to an inoperative posture in which no contact with the brake element is possible or to an operative posture in which a contact with the brake element is possible by changing a position of the at least one of the plurality of shifters.

Herein the number of the shifters which may make contact with the brake element may be changed by switching the state of the shifters to the operative posture or the inoperative posture by using the switching means. Since the state of the shifters may be changed to the operative posture or to the inoperative posture by using the switching means, the maximum braking force, the minimum braking force, or the rate of the change in the braking force may be varied. For this reason, the range in the adjustment of the braking force may be changed and the braking force may be freely adjusted depending on the weight of a lure or fishing methods.

The centrifugal braking device for a dual-bearing reel in a third aspect of the present invention is a device in accordance with the either of the first and second aspects, but further wherein at least a part of the plurality of shifters is disposed so that the position where they come into contact with the brake element differs in the rotational axis direction.

Herein, the number of the shifters that make contact with the brake element is changed by the movement of the brake element in the rotational axis direction by changing the contacting position of the shifter in the rotational axis direction so that the braking force may be adjusted in a minute manner.

The centrifugal braking device for a dual-bearing reel in a fourth aspect of the present invention is a device in accordance with the either of the first and second aspects, yet further wherein each of the plurality of shifters is attached to a plurality of guiding portions which is radially disposed on the rotary member towards the brake element, in a movable manner in the radius direction of the spool.

Herein, since the guiding portions are disposed on the rotary member, the guiding portions may be shifted more minutely in the rotational axis direction and, hence, the braking force may be adjusted more accurately.

The centrifugal braking device for a dual-bearing reel in the fifth aspect of the present invention is a device as set forth in the fourth aspect, yet further wherein the guiding portion includes a plurality of guide shafts disposed radially on the rotary member towards the brake element, and each of the plurality of shifters is attached to the guide shafts in a movable manner in the axial direction thereof.

Herein, since the guide shafts are stood on the rotary member, when the guide shafts are to be displaced in the rotational axis direction, they can be displaced minutely regardless of the diameter of the guide shaft. Accordingly, the braking force may be adjusted more accurately.

The centrifugal braking device for a dual-bearing reel in a sixth aspect of the present invention is a device as set forth in the fifth aspect, yet further wherein at least a portion of the plurality of guide shafts is attached to the rotary member so as to be displaced in a position in the rotational axis direction. In this centrifugal braking device, since the position of at least a portion of the guide shafts is displaced as compared with that of the other guide shafts, the number of the shifters that may make contact with the brake element may be changed by the movement of the brake element in the rotational axis direction and, hence, the braking force may be adjusted more minutely.

The centrifugal braking device for a dual-bearing reel in a seventh aspect of the present invention is a device as set forth in the fifth aspect, yet further wherein the switching means is capable of switching a state of the shifters to the two states by moving the shifters to a different position in the axial direction of the guide shafts. In this centrifugal braking device, the state of the shifters may be easily switched by simply moving the shifters in a different axial direction of the guide shafts.

The centrifugal braking device for a dual-bearing reel in an eighth aspect of the present invention is a device as set forth in the seventh aspect, yet further wherein the guide shaft is attached to a respective recessed portion radially formed around an outer periphery portion of the rotary member; and the switching means includes a pair of fixing projections formed on a side wall opposing in the rotational direction of the recessed portion so as to project towards the shifters, and shifter projections formed on the shifters so as to be capable of being engaged with the pair of fixing projections, at least one of the fixing projections and the shifter projection having an elasticity.

Herein, the state of the shifters is switched to the inoperative posture by restricting the movement of the shifters in the guide shaft direction by engaging the shifter projection with the fixing projections. The configuration of the switching means is therefore simplified. Moreover, employing the elasticity of at least either of the projections enables simple engagement and disengagement.

The centrifugal braking device for a dual-bearing reel in a ninth aspect of the present invention is a device as set forth in the eighth aspect, yet further wherein the rotary member further includes stop projections which are placed in a row in the radius direction of the fixing projections and capable of being engaged with the shifter projection. In this centrifugal braking device, since the shifters are not detached from the guide shaft due to the presence of the stop projections, a shifter whose position is shifted in the rotational axis direction with respect to the brake element is not detached from the guide shaft due to a centrifugal force nor does not make contact with other members. Also, the shifters do not come out of the guide shaft if the spool is separated from the reel body.

The centrifugal braking device for a dual-bearing reel in a tenth aspect of the present invention is a device as set forth in the sixth aspect, yet further wherein at least a part of the plurality of shifters which is attached to the same position of the guide shafts in the rotational axis direction has a contacting portion whose contacting position in the rotational axis direction is different from other shifters. In this centrifugal braking device, the braking force may be adjusted, even if the shifters are attached to the guide shafts whose positions in the rotary axis are the same, by disposing the contacting portions that make contact with the brake element at positions differing in the axial direction. Accordingly, the braking force may be adjusted in more minute manner.

The centrifugal braking device for a dual-bearing reel in an eleventh aspect of the present invention is a device as set forth in the sixth aspect, yet further wherein the shifters includes a main portion attached to the guide shafts and a contacting portion capable of making contact with the brake element fitted to the main portion, and the length of the contacting portion in the rotational axis direction is shorter than the length of the main portion in the rotational axis direction.

Herein, since the contacting portion may be disposed, being shifted in a position in the rotational axis direction, at the main portion, the number of the shifters which make contact with the brake element may be varied. For this reason, the braking force may be more minutely adjusted. Note that a certain degree of movement of the brake element needs to be secured in order to allow for errors in assembly.

The centrifugal braking device for a dual-bearing reel in a twelfth aspect of the present invention is a device as set forth in the sixth aspect, yet further wherein the shifters include a main portion attached to the guide shafts and a contacting portion capable of making contact with the brake element fitted to the main portion, and the length of the contacting portion in the rotational axis direction is shorter than an interval between the guide shafts in the rotational axis direction.

Herein, the contacting state may be released by, for instance, moving the brake element in a distance corresponding to the distance between the guide shafts in the rotational axis direction when the contacting portion is making contact with the brake element. That is, if the interval between the guide shafts is further shortened, the number of the shifters that make contact with the brake element may be securely changed by moving the brake element in a distance corresponding to the interval between the guide shafts.

The centrifugal braking device for a dual-bearing reel in a thirteenth aspect of the present invention is a device as set forth in the fourth aspect, yet further wherein the guiding portion includes a plurality of guiding surfaces formed radially on the rotary member oriented towards the brake element, and each of the plurality of shifters is attached to the respective guiding surface in a movable manner in the axial direction thereof. In this centrifugal braking device, the number of steps required for attaching the guide shafts to the rotary member may be reduced by attaching the shifters to the guiding surfaces formed radially on the rotary member in a movable manner.

The centrifugal braking device for a dual-bearing reel in a fourteenth aspect of the present invention is a device as set forth in the thirteenth aspect, yet further wherein the switching means is capable of switching a state of the shifters to the two states by moving the shifters to a different position in the radius direction of the guiding surfaces. In this centrifugal braking device, the state of the shifters may be easily switched by simply moving the shifters in different radius directions.

The centrifugal braking device for a dual-bearing reel in a fifteenth aspect of the present invention is a device in accordance with the either of the thirteenth aspect and fourteenth aspects, yet further wherein at least a part of the plurality of guiding surfaces is fitted to the rotary member so as to be shifted in a position in the rotational axis direction. In this centrifugal braking device, since the position of at least a portion of the guiding surfaces in the rotary axis is shifted with respect to that of other guiding surfaces, the number of the shifters that are capable of making contact with the brake element may be changed by the movement of the brake element in the rotational axis direction and, hence, the braking force may be finely adjusted.

The centrifugal braking device for a dual-bearing reel in a sixteenth aspect of the present invention is a device as set forth in the third aspect, yet further wherein the plurality of shifters are attached to the rotary member to be pivotable about a plurality of circumferentially spaced pivotal shafts provided thereon, and for coming into contact with the brake element.

Herein, since the plurality of shifters pivot and make contact with the brake element, the shifters are not liable to come off the rotary member, which keeps the shifters from getting lost. Also, since the shifters pivot, i.e., do not move linearly, space in the rotational axis direction increases and the movement is smooth.

The centrifugal braking device for a dual-bearing reel in a seventeenth aspect of the present invention is a device as set forth in the sixteenth aspect, yet further wherein the switching means is capable of switching a state of the shifters to the two states by moving the shifters to a different pivotal position. In this centrifugal braking device, the state of the shifters may be easily switched by simply pivoting the shifters.

The centrifugal braking device for a dual-bearing reel in an eighteenth aspect of the present invention is a device as set forth in the sixteenth aspect, yet further wherein at least a part of the plurality of pivotal axes is fitted to the rotary member so as to be shifted in a position in the rotational axis direction. In this centrifugal braking device, the number of the shifters that are capable of making contact with the brake element may be changed by the movement of the brake element in the rotational axis direction and, hence, the braking force may be minutely adjusted.

The centrifugal braking device for a dual-bearing reel in a nineteenth aspect of the present invention is a device in accordance with the either of the first and second aspects, yet further wherein the shifting mechanism includes a rotary member rotatably fitted to the reel body, and a rotary cam mechanism for moving the brake element by converting a rotation of the rotary member to a movement in the rotational axis direction. In this centrifugal braking device, since the rotary movement is converted to a linear movement in the axial direction by using the rotary cam mechanism, the amount of movement in the rotational axis direction may be minutely set with respect to an operation amount (i.e., the rotary amount). Accordingly, the braking force may be easily set in a minute manner.

The centrifugal braking device for a dual-bearing reel in a twentieth aspect of the present invention is a device in accordance with the either of the first and second aspects, yet further wherein the rotary member is non-rotatably fitted to the spool. In this centrifugal braking device, since the rotary member is fitted to the spool, the spool may be braked if it is rotatable with respect to the spool shaft.

The centrifugal braking device for a dual-bearing reel in a twenty-first aspect of the present invention is a device in accordance with the either of the first and second aspects, yet further wherein the rotary member is non-rotatably fitted to a rotary shaft of the spool. In this centrifugal braking device, since the rotary member is non-rotatably fitted to the rotary shaft of the spool, the spool may be braked regardless of the shape thereof.

The centrifugal braking device for a dual-bearing reel in a twenty-second aspect of the present invention is a device for braking a spool which is rotatably fitted to the reel body and includes a cylindrical brake element whose rotation is restricted with respect to the reel body; a rotary member which rotates together with the spool; a plurality of guide shafts radially fitted to the rotary member; and a plurality of shifters, each of which is movably attached to the guide shafts and moved towards the brake element by a centrifugal force generated by a rotation of the spool so as to make contact with the brake element, a braking characteristic of at least one of the shifter being different from a braking characteristic of other shifters.

In this centrifugal braking device, the braking characteristic of at least one of the shifters is different. Accordingly, the braking force may be minutely adjusted by variously combining the shifters having the different braking characteristics.

The centrifugal braking device for a dual-bearing reel in a twenty-third aspect of the present invention is a device in accordance with the twenty-second aspect, yet further wherein the shifters differing in braking characteristics can be respectively fit only to corresponding said guide shafts.

In a braking device including a plurality of shifters having differing braking characteristics, if, for instance, all of plurality of guide shafts are the same, the shifters having the differing braking characteristics may be freely attached to any of the guide shafts. For this reason, attaching the shifters associated with predetermined guide shafts in order to put the shifters in a well-balanced arrangement risks mis-assembling the shifters differing in braking characteristics.

Herein, in the twenty-third aspect of the centrifugal braking device, since the shifters differing in braking characteristics can only be fit to corresponding predetermined guide shafts, mis-assembly due to mistakes in attachment position of the shifters is prevented. Accordingly, the shifters may be certainly attached to the predetermined guide shaft and a desired braking force can be obtained.

The centrifugal braking device for a dual-bearing reel in a twenty-fourth aspect of the present invention is a device in accordance with the twenty-third aspect, yet further wherein the shape of a cross section of each of the guide shafts is different so as to correspond to each of the shifters having different braking characteristics.

Herein, the shifter may be attached only to the predetermined corresponding guide shaft due to the difference in the cross sectional shape of the guide shaft.

The centrifugal braking device for a dual-bearing reel in a twenty-fifth aspect of the present invention is a device in accordance with the twenty-fourth aspect, yet further wherein the shape of the cross section of the guide shafts is formed so as to be non-symmetric with respect to a face orthogonal to a rotary axis of the spool.

Herein, since the rotation of the shifters are stopped with respect to the guide shafts, they may be positioned in a predetermined direction.

The centrifugal braking device for a dual-bearing reel in a twenty-sixth aspect of the present invention is a device in accordance with the twenty-fifth aspect, yet further wherein the shape of the cross section of the guide shafts is trapezoidal.

The centrifugal braking device for a dual-bearing reel in a twenty-seventh aspect of the present invention is a device in accordance with the any of twenty-second to twenty-sixth aspects, yet further wherein the braking characteristic of at least one of the shifters is different due to a difference in mass thereof.

Herein, since a difference in the centrifugal force is generated by the difference in mass of the shifters, the braking force may be adjusted.

The centrifugal braking device for a dual-bearing reel in a twenty-eighth aspect of the present invention is a device in accordance with the any of twenty-second to twenty-sixth aspects, yet further wherein the braking characteristic of the at least one of shifters is different due to a difference in frictional coefficient thereof.

Herein, the braking characteristic of each of the shifters may be varied by changing the frictional coefficient of the shifters by, for instance, using different materials for the shifters or changing the shape of the contacting portion of the brake element.

The centrifugal braking device for a dual-bearing reel in a twenty-ninth aspect of the present invention is a device in accordance with the any of twenty-second to twenty-sixth aspects, further comprising a switching means for changing a state of at least one of the plurality of shifters to an inoperative posture in which no contact with the brake element is possible or to an operative posture in which a contact with the brake element is possible by changing a position of the at least one of the plurality of shifters.

Herein, since the state of the shifters may be switched to the inoperative posture or the operative posture by using the switching means, a rate of change in maximum braking force, minimum braking force, or the braking force may varied. Accordingly, an adjustable range of the braking force may be changed and, hence, the braking force may be freely adjusted depending of lure weight or fishing method.

The centrifugal braking device for a dual-bearing reel in a thirtieth aspect of the present invention is a device in accordance with the twenty-ninth aspect, yet further wherein the switching means is capable of switching a state of the shifters to either of the two postures by moving the shifters to different positions in an axial direction of the guide shafts.

Herein, the state of the shifters may be easily switched by simply moving the shifters to different positions in the axial direction of the guide shafts. Here, the braking characteristic of the shifters having the switching means may be different from that of the shifters having no switching means. Also, among the shifters having the switching means, the braking characteristic of the shifters in the inoperative posture may be different from that of the shifters in the operative posture.

The centrifugal braking device for a dual-bearing reel in a thirty-first aspect of the present invention is a device in accordance with the twenty-second aspect, yet further wherein the brake element is movable in the rotational axis direction of the spool; and the shifters are capable of making contact with the brake element with different number thereof due to a movement of the brake element in the rotational axis direction.

Herein, the braking force may be adjusted in a more minute manner without depending on the number of the guide shafts at different positions.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

First Embodiment

Overall Configuration

Figure 1:
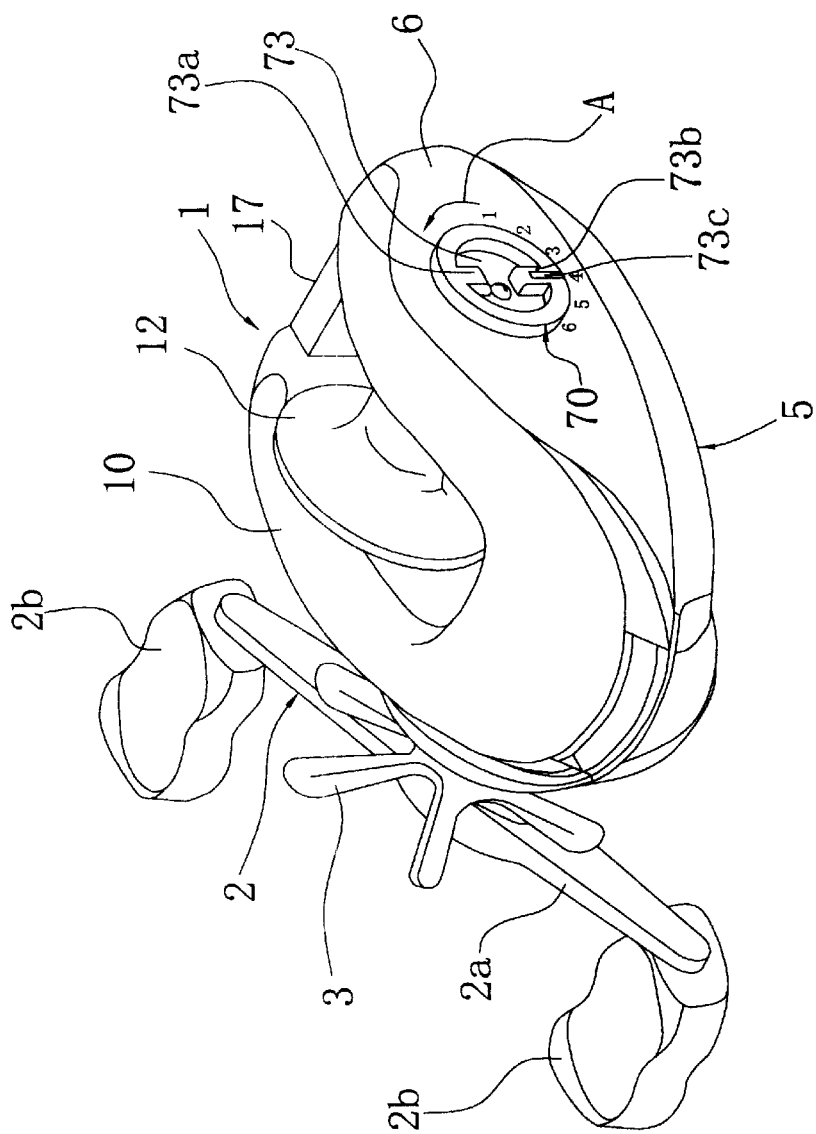
FIG. 1 is a perspective view of a dual-bearing reel according to which an embodiment of the present invention is applied.

Reference is made to FIG. 1, the perspective view of a dual-bearing reel in which an embodiment according to the present invention is adapted.

The dual-bearing reel shown in the figure is a bait reel chiefly used in lure fishing and includes a reel body 1, a handle 2, and a star drag 3 for adjusting drag. The handle 2 is provided for rotating the spool and is disposed on one side of the reel body 1. The star drag 3 is disposed on the reel-body side of the handle 2. The handle 2 is a dual-handle type that includes a plate-type arm portion 2a and holding portions 2b, each of which is rotatably fitted to a respective end of the arm portion 2a. The outer surface of the arm portion 2a of the handle 2 is a smooth seamless surface to keep fishing line from getting tangled on it.

Figure 2:
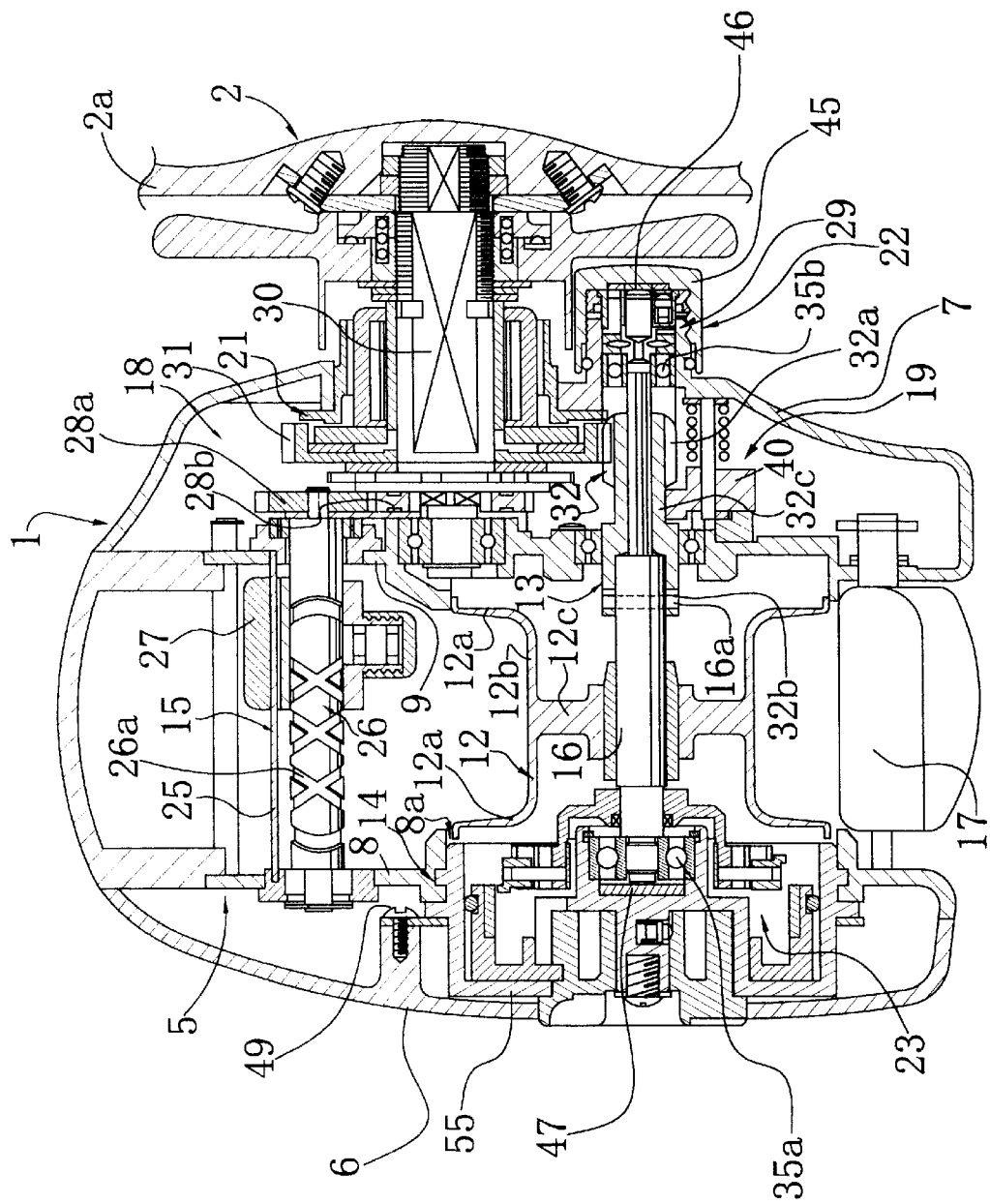
FIG. 2 is its cross-sectional view.

As shown in FIG. 2, the reel body 1 includes a frame 5, a first side cover 6, a second side cover 7, and a thumb rest 10. The first side cover 6 and the second side cover 7 are disposed on respective sides of the frame 5. The thumb rest 10 is disposed on an upper portion of the frame 5. The frame 5 includes a pair of side plates 8 and 9, which are disposed opposite each other at a predetermined spacing, and a plurality of (not shown) connecting members, each of which connects the side plates 8 and 9.

The second side cover 7, which is located on the handle 2 end, is detachably fastened to the side plate 9 by screws. The first side cover 6, which is located on the opposite end of the handle 2, is detachably fitted to the side plate 8 by a bayonet coupling 14. An opening 8a, through which the spool 12 penetrates, is formed in the side plate 8 located on the opposite end of the handle 2.

Inside the frame 5 are the spool 12, a level wind mechanism 15, and a clutch operation lever 17. The level wind mechanism 15 is provided for uniformly winding on fishing line around the spool 12. The clutch operation lever 17 on which the thumb is rested during a thumb-actuated operation is also used as a clutch lever. A gear mechanism 18, a clutch mechanism 13, a clutch engage/disengage mechanism 19, a drag mechanism 21, and a casting control mechanism 22 are provided in the space between the frame 5 and the second side-cover 7. The gear mechanism 18 transmits rotational force from the handle 2 to the spool 12 and the level wind mechanism 15. The clutch engage/disengage mechanism 19 engages/disengages the clutch mechanism 13 in accordance with operation of the clutch operation lever 17. The drag mechanism 21 brakes the spool 12 when fishing line is released. The casting control mechanism 22 brakes the spool 12 by grasping the spool's spindle 16 at either end. Also, a centrifugal braking mechanism 23 for preventing backlash during casting is provided between the frame 5 and the first side-cover 6.

The spool 12 on either side has saucer-shaped flange portions 12a, and between the flange portions 12a has tubular line-winding trunk 12b. Also, the spool 12 has a tubular boss portion 12c that is formed integral with the inner peripheral side of the line-winding trunk 12b in the middle. By, for example, a serration engagement the spool 12 is non-rotatably fixed to the spool spindle 16, which penetrates through the boss portion 12c.

The spool spindle 16 penetrates the side plate 9 and extends outside the second side-cover 7. The extended end of the spool spindle 16 is rotatably supported on a bearing 35b in a boss 29 that is formed in the second side cover 7. Also, bearing 35a in the centrifugal braking mechanism 23 rotatably supports the other end of the spool spindle 16.

The level wind mechanism 15 includes a guide tube 25, a worm shaft 26, and a line guide 27. The guide tube 25 is fixed between the pair of side plates 8 and 9. The worm shaft 26 is rotatably supported in the guide tube 25. A gear 28a, which forms a part of the gear mechanism 18, is fixed to one end of the worm shaft 26. Also, a spiral groove 26a is formed on the worm shaft 26, and the line guide 27 is meshed with the spiral groove 26a. The line guide 27 therefore reciprocates along the guide tube 25 by the worm shaft 26 being rotated via the gear mechanism 18. A fishing line is inserted in the line guide 27 and uniformly wound onto the spool 12.

The gear mechanism 18 includes a main gear 31, a pinion gear 32, the above-mentioned gear 28a, and a gear 28b. The main gear 31 is coupled to a handle shaft 30. The pinion gear 32 is cylindrical and is engaged with the main gear 31. The gear 28a is fixed to one end of the worm shaft 26. The gear 28b is non-rotatably fixed to the handle shaft 30 and engaged with the gear 28a.

The pinion gear 32, a cylindrical member disposed penetrating the side plate 9, is centrally penetrated by the spool spindle 16. The pinion gear 32 is fitted to be axially shiftable on the spool spindle 16. The pinion gear 32 includes a toothed portion 32a and an meshing portion 32b. The toothed portion 32a is located on the right side of the reel body 1 shown in FIG. 2 and engages with the main gear 31. The meshing portion 32b is formed at the other end of the pinion gear 32. A constricted portion 32c is established between the toothed portion 32a and the meshing portion 32b. The meshing portion 32b is constituted by a recessed groove formed on the end face of the pinion gear 32, and a clutch pin 16a, which radially penetrates the spool spindle 16, engages in the meshing portion 32b. Shifting the pinion gear 32 outward detaches the clutch pin 16a on the spool spindle 16 from the recessed groove in the meshing portion 32b, such that rotation from the handle shaft 30 is not transmitted to the spool 12. The clutch mechanism 13 is constituted by the recessed groove of the meshing portion 32b and the clutch pin 16a.

As shown in FIG. 2, the clutch operation lever 17 is disposed on the back of the spool 12 in the rear part between the pair of the side plates 8 and 9. An oblong hole (not shown) is formed in the side plates 8 and 9 of the frame 5, and a clutch cam (not shown) that fixes the clutch operation lever 17 penetrates the oblong hole. Thus, the thumb rest 17 slides up and down along the oblong hole.

The clutch engage/disengage mechanism 19 shifts the clutch yoke 40 parallel to the axis of the spool spindle 16. Further, when the handle shaft 30 is rotated in the line reeling-in direction, the clutch engage/disengage mechanism 19 shifts the clutch yoke 40 whereby the clutch mechanism 13 is automatically put on.

In the configuration thus, the pinion gear 32 in the usual state is situated in the inward clutch-engaging position wherein the meshing portion 32b is engaged with the clutch pin 16a in the spool spindle 16, which is the clutch-on state. On the other hand, when the clutch yoke 40 shifts the pinion gear 32 outward, engagement of the meshing portion 32b and the clutch pin 16a is released, which is the clutch-off state.

The casting control mechanism 22 includes a cap 45, and drag washers 46 and 47. The cap 45, shaped as a cylinder having a base, is engaged with a male screw portion formed on an outer periphery of the boss portion 29. The drag washer 46 is attached to the bottom of the cap 45. The drag washer 47 is attached to a brake case (will be described later). Both of the drag washers 46 and 47 make contact with both ends of the spool shaft 16 to hold the spool shaft 16. The braking force may be adjusted by rotating the cap 45 to adjust a holding force generated by both the drag washers 46 and 47.

Centrifugal Braking Mechanism Configuration

Figure 3:
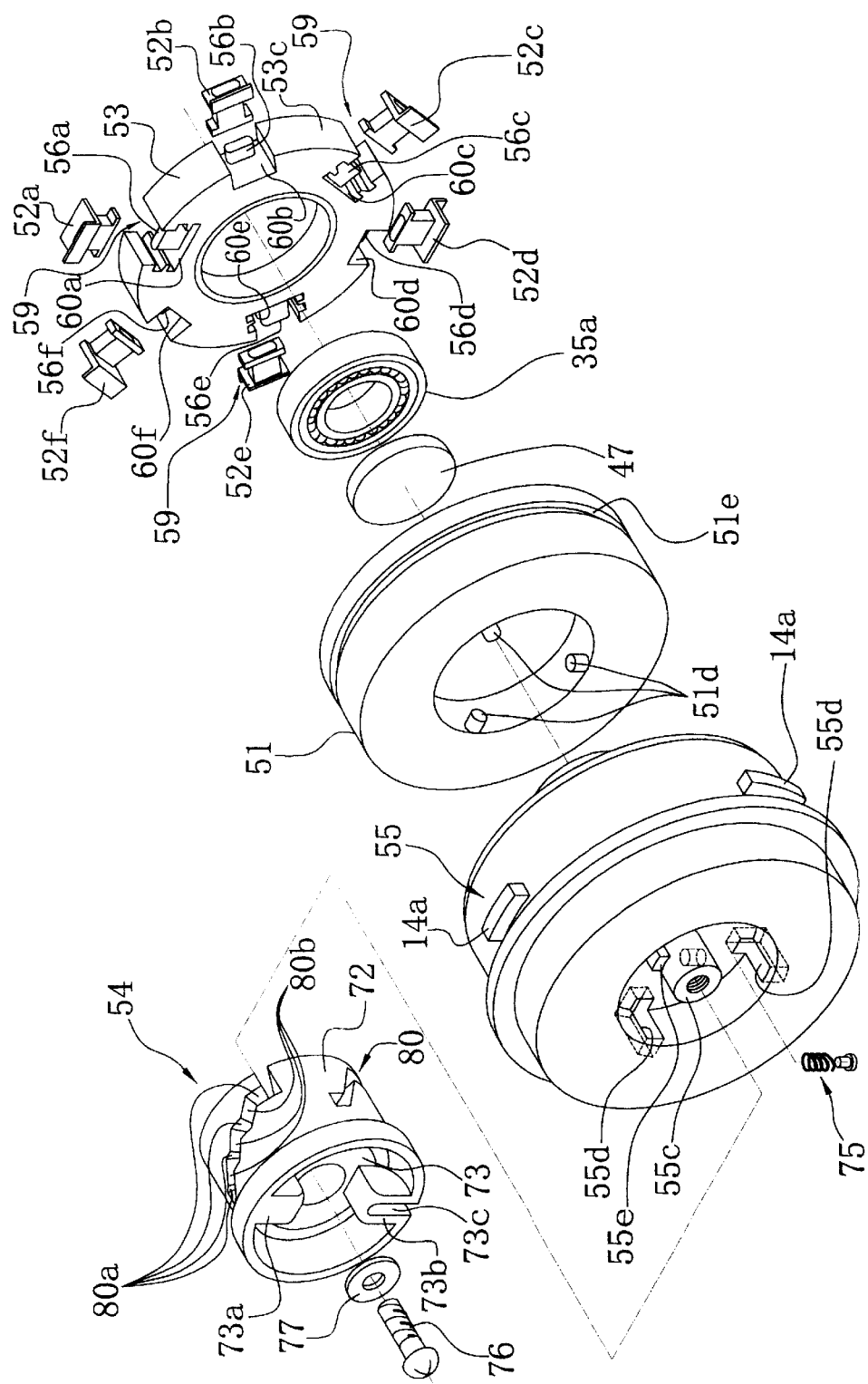
FIG. 3 is an exploded perspective view of a centrifugal braking mechanism.
Figure 4:
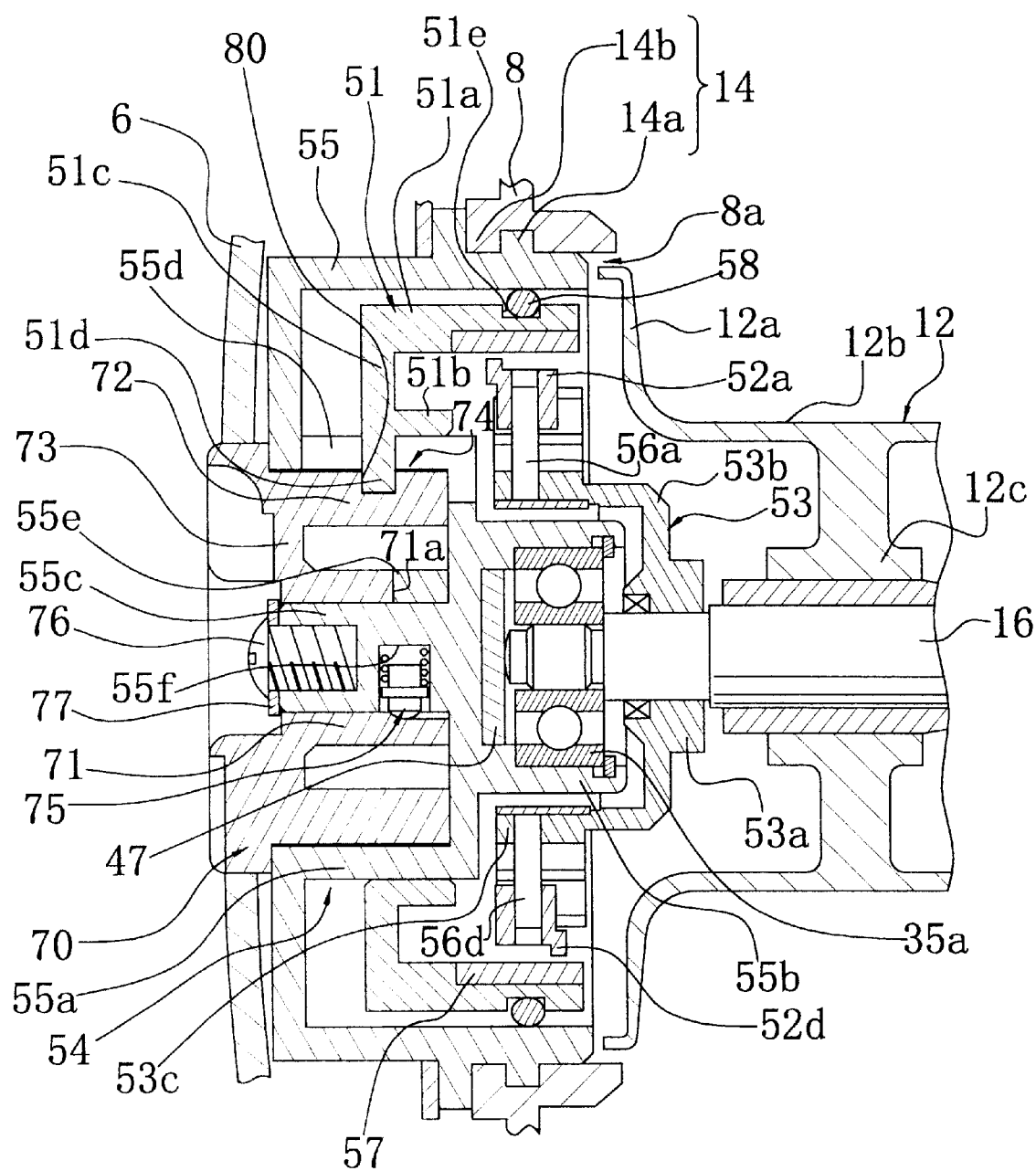
FIG. 4 is an enlarged cross-sectional view of the centrifugal braking mechanism.

As shown in FIGS. 3 and 4, the centrifugal braking mechanism 23 includes a brake element 51, six shifters 52a–52f, a switching mechanism 59 and a shifting mechanism 54. The brake element 51 is non-rotatably attached to a brake case 55 in a movable manner in the spool axial direction. The shifters 52a–52f are disposed radially for coming into contact with the brake element 51. The switching mechanism 59 is capable of changing the state of three shifters 52a, 52c, and 52e among the six shifters 52a–52f from an inoperative posture in which they are incapable of making contact with the brake element 51 to an operative posture in which they are capable of making contact with the brake element 51. The shifting mechanism 54 shifts the brake element 51 in the spool axial direction.

The brake case 55 is a short cylindrical member having a bottom and includes a knob-accommodating portion 55a and a bearing-accommodating portion 55b. The knob-accommodating portion 55a has a cylindrical shape and protrudes inwardly to the inner peripheral side of the brake case 55. The bearing-accommodating portion 55b is a cylindrical shaped member. The bearing accommodating portion 55b is disposed on the inner bottom portion of the knob-accommodating portion 55a and protrudes inwardly. A rod-shaped knob-supporting portion 55c protruding outwardly is formed at the outer side of the bottom portion of the knob-accommodating portion 55a. A bearing 35a for supporting the spool shaft 16 is disposed in the bearing-accommodating portion 55b and the drag washer 47 of the casting control mechanism 22 is attached to the inner bottom portion thereof. The knob-supporting portion 55c is provided for rotatively supporting a braking knob (described later) of the shifting mechanism 54. Three circumferentially spaced penetrating grooves 55d are formed along the spool axial direction. A rotation-restriction projection 55e for restricting the degree of rotation of the braking knob 70 is formed on the outer periphery of the base end of the knob-supporting portion 55c. A circular hole 55f is formed running radially in the outer peripheral surface of the knob-supporting portion 55c.

The brake case 55 is fixed to the first side cover 6 by a screw 49 (FIG. 2). That is, the brake case 55 forms a part of the reel body 1. Three circumferentially spaced projections 14a that constitute the bayonet coupling 14 are formed on the outer surface of the brake case 55. Also, a retaining pawl 14b is formed on the opening 8a in a location opposing the projections 14a. The retaining pawl 14b projects outwardly from the opening 8a toward the inner peripheral side.

The brake element 51 is a cylindrical member having an outer cylindrical portion 51a, an inner cylindrical portion 51b, and a wall portion 51c. The outer cylindrical portion 51a is disposed proximate to the inner peripheral surface of the brake case 55. The inner cylindrical member 51b meshes with the outer peripheral surface of the knob-accommodating portion 55a of the brake case. The wall portion 51c connects the cylindrical portions 51a and 51b. A brake lining 57 made of, for instance, copper alloy, is fastened to the inner peripheral surface of the outer cylindrical portion 51a. The brake lining 57 makes contact with the shifters 52a–52f. Three circumferentially spaced cam pins 51d projecting inwardly are formed on the inner peripheral surface of the inner cylindrical portion 51b. The cam pins 51d are engaged with the penetrating grooves 55d so that the brake element 51 is non-rotatably coupled to the brake case 55. Also, the cam pins 51d penetrate the penetrating grooves 55d and project inwardly, forming a rotary cam mechanism 74. An annular groove 51e is formed on the outer peripheral surface of the outer cylindrical member 51a. An O-ring 58 is fitted into the annular groove 51e. The O-ring 58 makes the axial travel of the brake element 51 a smooth movement having a resistive feel.

The shifters 52a–52f are attached to guide shafts 56a–56f stood on the rotary member 53, wherein they are allowed to shift radially (in the axial direction of the guide shafts 56a–56f).

The rotary member 53 is non-rotatably attached to the spool shaft 16 to be axially immovable by a suitable means such as serration and rotates together with the spool 12. The rotary member 53 includes a boss portion 53a, a cylindrical member 53b, and a circular plate member 53c. The boss portion 53a is fixed to the spool shaft 16. The cylindrical member 53b extends outwardly from the boss portion 53a. The circular plate member 53c extends radially outward from the outer peripheral surface of the cylindrical member 53b. The circular plate member 53c is disposed radially outward of the bearing accommodating portion 55b.

Figure 6:
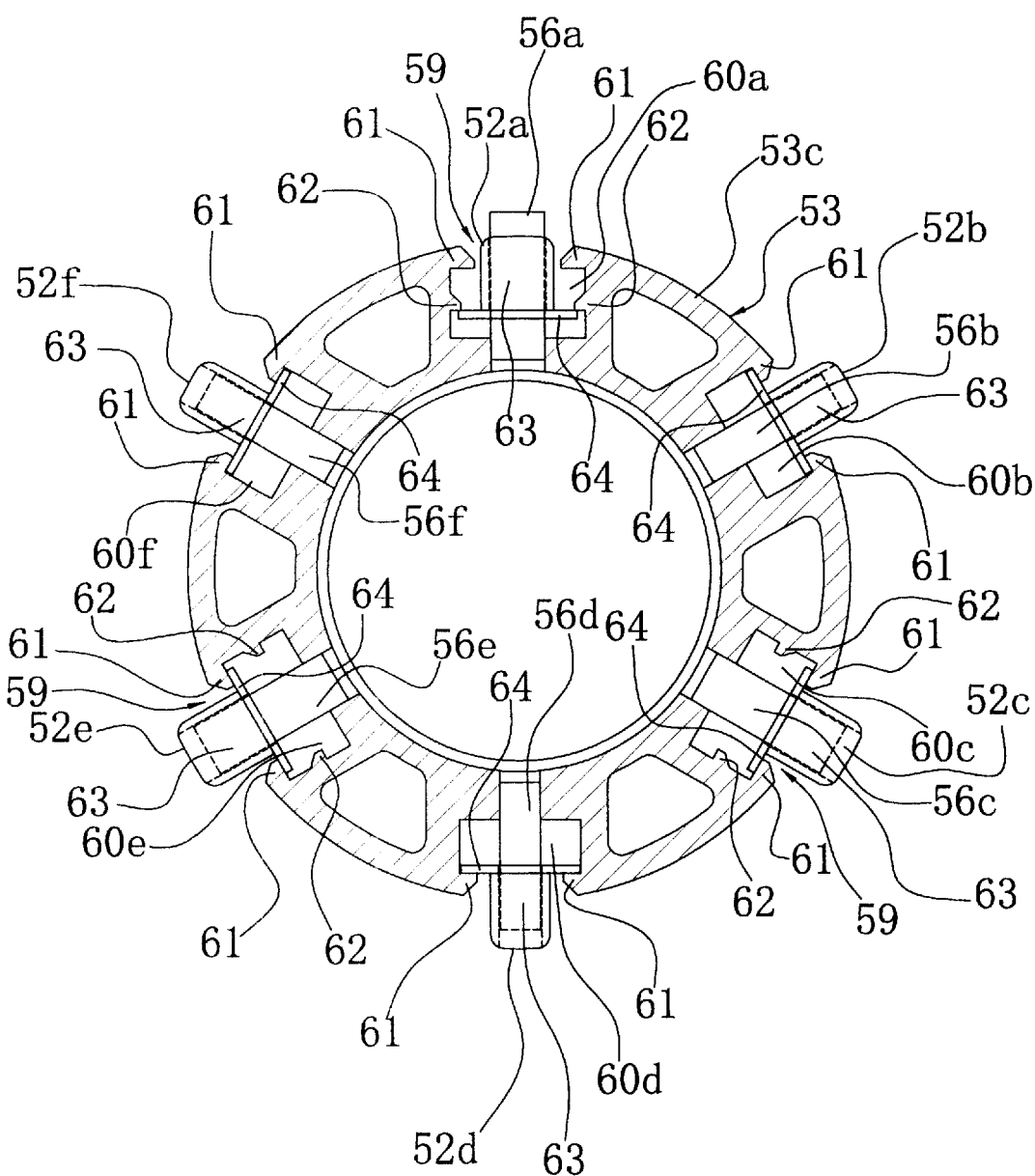
FIG. 6 is a side cross-sectional view showing the attachment states of the shifters.

As shown in FIG. 6, six substantially rectangular-shaped recesses 60a–60f opening towards the outer peripheral surface side are formed circumferentially space on the circular plate member 53c of the rotary member 53. The guide shafts 56a–56f are radially fitted into the recesses 60a–60f. Among them, three recesses 60a, 60c, and 60e have a structure that is different compared to that of the three recesses 60b, 60d, and 60f. That is, the recesses having the differing structure are disposed in alternation. In the opening of each of the recesses 60a, 60c, and 60e is a pair of stop projections 61 that protrude opposing each other in the circumferential direction. The recesses 60a, 60c, and 60e each also have pairs of fixing projections 62 disposed at a spacing to the inner peripheral side of the stop projections 61. The fixing projections 62 form the switching mechanism 59 that switches the state of the shifters 52a, 52c and 52e from an operative posture to an inoperative posture. On the other hand, each of the recesses 60b, 60d, and 60f has only the stop projections 61. For this reason, the switching mechanism 59 is not established in the recesses 60b, 60d, and 60f.

Figure 5A:
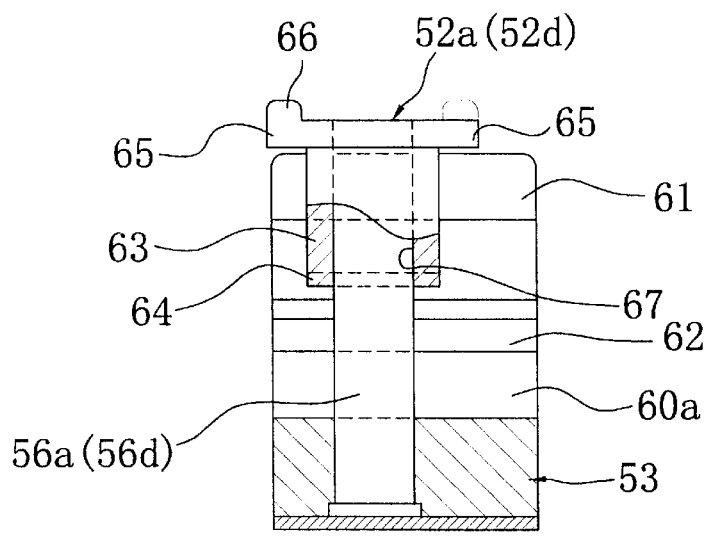
FIGS. 5A to 5C are enlarged cross-sectional views showing attachment states of shifters.
Figure 5B:
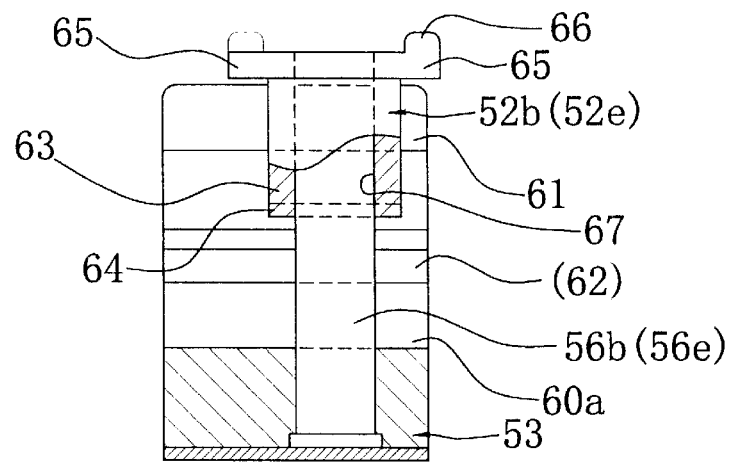
Figure 5C:
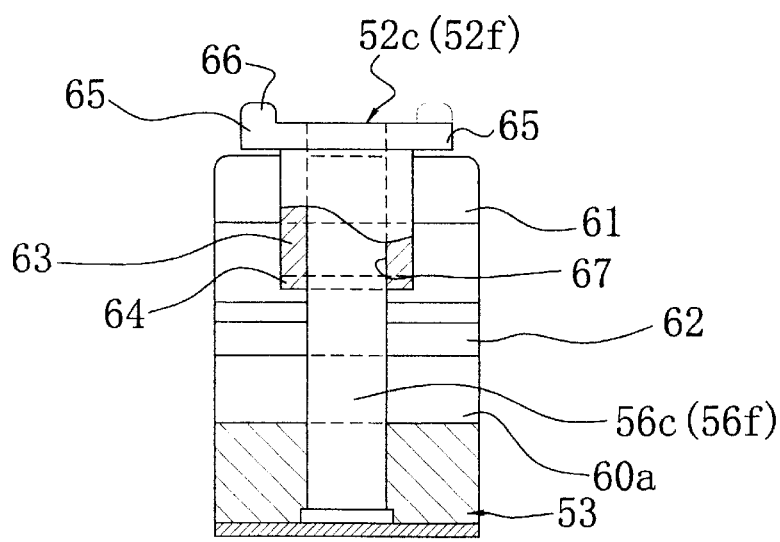

The guide shafts 56a–56f are stood diametrically oriented on the bases of the recesses 60a–60f. Guide shafts 56a, 56c, and 56e and the remaining guide shafts 56b, 56d, and 56f are all axial elements elliptical in cross section. The two groups differ in the length of the major axis of their elliptical cross sections, with the major axis length of the guide shafts 56a, 56c, and 56e being longer than that of the guide shafts 56b, 56d, and 56f. Further, as shown in FIG. 5A, the guide shafts 56a and 56d are stood outward most axially (FIG. 5 left-hand side); as shown in FIG. 5B, the guide shafts 56b and 56e are stood inward most axially (FIG. 5 right-hand side); and as shown in FIG. 5C, the guide shafts 56c and 56f are stood in an intermediate position between the two. That is, the six guide shafts 56a–56f are disposed in three places displaced in the axial direction of the spool.

Different numbers of the shifters 52a–52f, attached to the guide shafts 56a–56f to be slidable in the spool diametric orientation (guide shaft axial direction), are brought into contact with the brake lining 57 of the brake element 51 by shifting the brake element 51 in the spool axial direction. The six shifters 52a–52f are substantially rectangular rods made of a synthetic resin having elasticity. Although among them the three shifters 52a, 52c, and 52e have roughly the same shape as the remaining three shifters 52b, 52d, and 52f, the sizes of the holes in which they are guided differ by the difference in the major axis length of the guide shafts 56a–56f on which they are fitted.

The shifters 52a–52f include: rectangular rod-shaped bodies 63 that are guided separately on the guide shafts 56a–56f; a pair of shifter projections 64 formed integrally with the bodies 63 on the inside ends thereof (lower ends in FIG. 5) and projecting from the bodies 63 in either rotational direction (directions orthogonal to the plane of the FIG. 5 sheet); and a pair of contact portions 65 formed integrally on the outside ends of the bodies 63 (upper ends in FIG. 5) and projecting from the bodies 63 in either direction along the spool axis (right/left directions in FIG. 5).

Elliptical guide holes 67 running in the diametrical direction of the spool shaft 16 penetrate the bodies 63. The guide shafts 56a–56f are fit into the guide holes 67 so that the shifters 52a–52f are guided in the guide shafts 56a–56f, allowed to travel in the diametric orientation. The shifter projections 64 project so as to interlock with the pairs of fixing projections 62 and stop projections 61. When the shifter projections 64 are disposed between the fixing projections 62 and the stop projections 61, interlocking of the shifter projections 64 prevents detachment of the shifters 52a–52f. The posture of the shifters 52a, 52c and 52e disposed in this position is the operative posture. Further, when the shifters 52a, 52c and 52e are thrust diametrically inward, disposing them further inward than the fixing projections 62, the shifter projections 64 are interlocked by the fixing projections 62, and the shifters 52a, 52c and 52e cannot come into contact with the brake element 51. This posture wherein they are disposed in this position is the inoperative posture. The fixing projections 62 and the shifter projections 64 constitute the switching mechanism 59. Therefore, the number of the shifters 52a, 52c and 52e able to come into contact with the brake element 51 can be adjusted. A diametrically outward protruding contact nub 66 protrudes on one of each pair of contacting portions 65. The contact nubs 66 are protuberances that come into contact with the inner circumferential surface (braking face) of the brake lining 57 on the brake element 51, and are formed to arc circumferentially (orthogonal to the plane of the sheet) so as to go along the inner circumferential surface of the brake element 51.

The contact nubs 66 on the shifters 52a–52f come into contact against the brake element 51 in two different positions in the spool axial direction by altering the way they are fitted onto the guide shafts 56a–56f. Namely, as shown in FIG. 5A, there are a first position indicated by solid lines, and a second position, indicated by phantom lines, in which the way they are fitted is reversed to the first position. Again, because the guide shafts 56a–56f are stood in positions that differ in the axial direction of the spool as described earlier, as shown in FIGS. 5B and 5C, the contact nubs 66 come into contact with the brake element 51- herein differing from the two FIG. 5A positions—in a third position (hidden lines) and a fourth position (solid lines); and in a fifth position (solid lines) and a sixth position (hidden lines). Consequently, the contact nubs 66 on the shifters 52a–52f are able to come into contact with the brake element 51 in six different spool axial positions. Accordingly, the braking force adjustable in six different stages in this embodiment. The six-stage braking force is minutely alterable by the orientation (how attached) of the contact nubs 66 on the shifters 52a–52f, and the number of shifters 52a–52f able to come into contact with the brake element 51. For example in this embodiment, the number of the shifters 52a–52f that contact the brake element 51 is changed in the order 6-5-4-3-2-1 by shifting the brake element 51 axially. As described earlier, the number of shifters 52a–52f that contact the brake element 51 at each stage is freely alterable according to an angler's preference, or the type or weight of lure used. Moreover, because the shifters 52a, 52c and 52e are switchable between the operative posture and the inoperative posture, the braking force may be adjusted in still smaller ranges. The braking force adjustment ranges can therefore be altered.

As shown in FIGS. 3 and 4, the shifting mechanism 54 includes the braking knob 70 and a rotary cam mechanism 74. The braking knob 70 is rotatively fitted to the reel body 1. The rotary cam mechanism 74 converts the turning of the braking knob 70 to the movement in the spool axial direction and reciprocates the brake element 51.

The braking knob 70 is attached to the knob supporting portion 55c of the brake case 55 and fixed in a rotatable manner by a bolt 76 which is screwed in an end of the knob supporting portion 55c via a washer 77. The braking knob 70 includes a boss portion 71, a cam portion 72, and a handle 73. The boss portion 71 has a cylindrical shape and is attached to the knob supporting portion 55c. The cam portion 72 has a cylindrical shape and is disposed to the outer peripheral side of, and at a spacing from, the boss portion 71. The handle 73 has a circular plate shape and connects the boss portion 71 with the cam portion 72. A positioning mechanism 75 for determining the position of the braking knob 70 at the three positions in the circumferential direction is placed between the boss portion 71 and the knob supporting portion 55c. The positioning mechanism 75 is located in the circular hole 55f. A notch 71a is formed at the end of the boss portion 71 in the circumferential direction. The range of the rotation of the braking knob 70 may be restricted to, for instance, about 90 degrees by engaging the notch 71a with the rotation restriction projection 55e formed with the knob supporting portion 55c. Three cam grooves 80 penetrate through the cam portion 72 in the radius direction with a space between each other in the circumferential direction to form the rotary cam mechanism 74.

Each of the cam grooves 80 includes six braking slots 80a formed at predetermined circumferential lengths in equally spaced positions that differ axially and circumferentially, and diagonally running grooves 80b that join the braking slots 80a, formed roughly diagonally in the cam portion 72.

The handle 73 includes two outwardly protruding protuberances 73*a* and 73*b*. An indicator 73*c* is formed as a radial groove on the protuberance 73*b*. As shown in FIG. 1, numbers from 1 to 6 are marked on the first cover 6 around the pointer 73*c* by which the indicator 73*c* indicates the level of the braking force.

The rotary cam mechanism 74 includes three cam pins 51*d* protruding from the inner surface of the brake element 51 and the cam grooves 80 that are engaged with the cam pins 51*d*. By the engagement of the cam pins 51*d* with the cam grooves 80, the rotation of the braking knob 70 is converted to the movement of the rotary cam mechanism 74 in the axial direction. Moreover, engaging the cam pins 51*d* into the braking slots 80*a* in the six places positions the rotary cam mechanism 74 into six positions axially.

Herein, when the cam pin 51*d* is engaged with the forward endmost braking slot 80*a* (right-hand side in FIG. 3), the brake element 52 is advanced and disposed into the position, shown in FIG. 4, closest to the spool 12. The number of the shifters 52*a*–52*f* that contact the brake lining 57 on the brake element 51 becomes maximal, maximizing the braking force. Again, when the cam pin 51*d* is engaged with the base endmost braking slot 80*a* (left-hand side in FIG. 3), the brake element 51 is retracted and disposed into the position, shown in FIG. 7, parted furthermost from the spool 12. Here the number of the shifters 52*a*–52*f* that contact with the brake element 51 becomes minimal, minimizing the braking force.

Reel Operation

Figure 7:
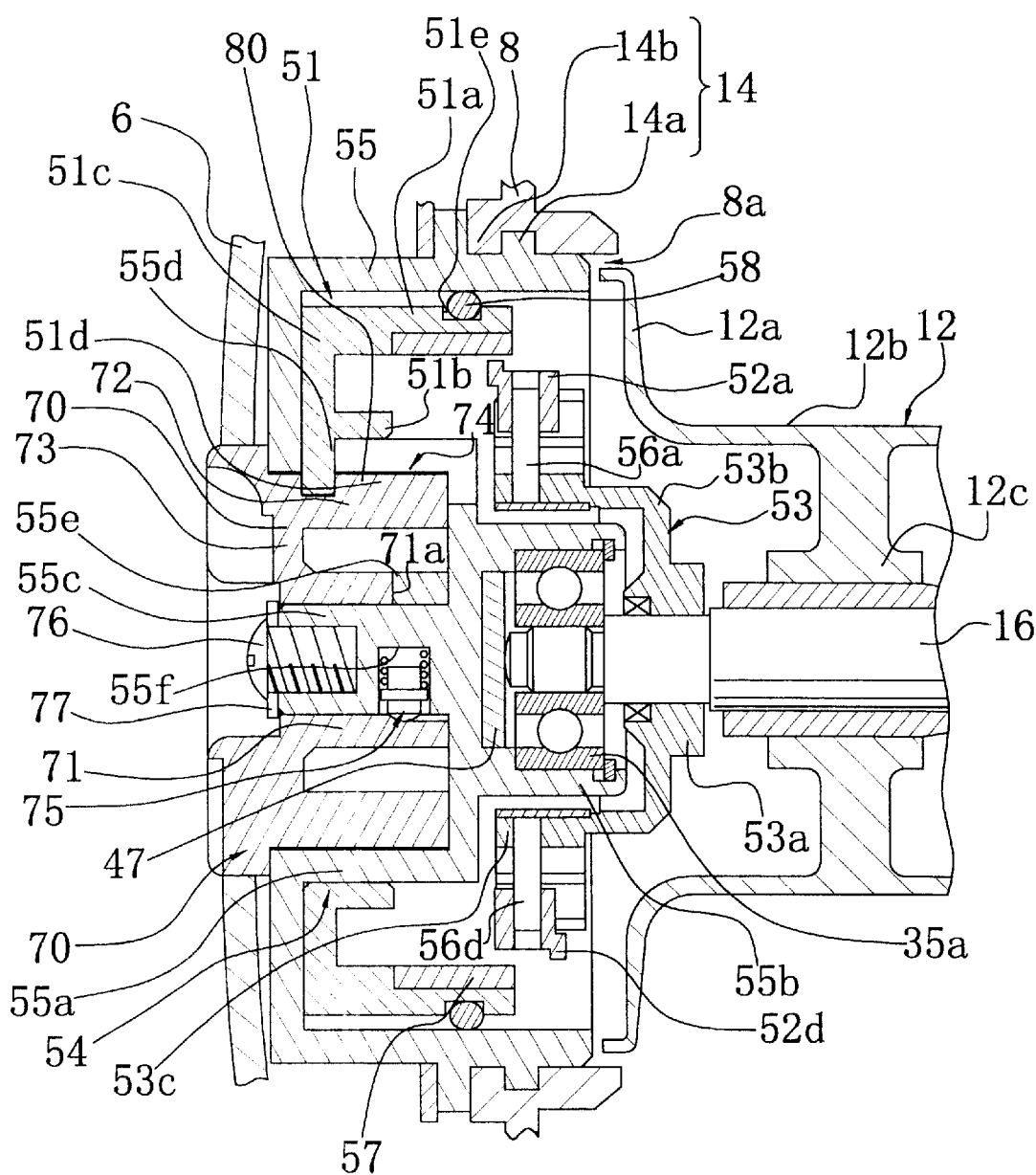
FIG. 7 is a diagram corresponding to FIG. 4 showing a state in which a brake element is located furthermost from a spool.

In a normal state, the clutch yoke 40 is pressed inwardly to achieve a clutch-on state. As a result, the rotational force from the handle 2 is transmitted to the spool 12 via the handle shaft 30, the main gear 31, the pinion gear 32 and the spool shaft 16 to rotate the spool 12 in the line reeling-in direction. At this time, although a centrifugal force is applied to the shifters 52*a*–52*f* of the centrifugal braking mechanism 23 to move the shifters 52*a*–52*f* outwardly in the radius direction, the braking force does not become so large since the rotation speed of the spool 12 is slow and, hence, it does not interfere with the rotation of the handle 2. However, if it is necessary to reduce the braking force, the braking knob 70 may be rotated so that the brake element 51 is placed at a position at which the braking force is the weakest as shown in FIG. 7.

When a fishing line is cast, the braking force is adjusted to prevent backlash by rotating the braking knob 70. When the braking knob 70 is rotated in the direction indicated by an arrow A in FIG. 1, the brake element 51 is receded from the spool 12 by the rotary cam mechanism 74. Accordingly, the number of the shifters 52*a*–52*f* which make contact with the brake element 51 is gradually decreased and, hence, the braking force is gradually attenuated. When the braking knob 70 is rotated to the position where the pointer 73 indicates the numeral "1", the brake element 51 is placed at the position shown in FIG. 7 and the braking force is minimized.

Then, the clutch operation lever 17 may be pushed downwardly. The clutch yoke 40 is moved outwardly according to the movement of the clutch operation lever 17, and the pinion gear 32 is also moved in the same direction. As a result, the clutch is entered to a clutch-off state. In the clutch-off state, the rotation from the handle shaft 30 is not transmitted to neither the spool 12 nor the spool shaft 16, and the spool 12 may freely rotate. When a fishing rod is swung in the clutch-off state so that a reel is inclined in the axis direction in order for the spool shaft 16 to face a vertical surface while thumbing the spool using a thumb on the clutch operation lever 17, a lure is cast and the spool 12 rotates vigorously in the line-releasing direction.

In this state, the spool shaft 16 is rotated in the line-releasing direction by the rotation of the spool 12 and the rotation is transmitted to the rotary member 53. When the rotary member 53 is rotated, the shifters 52*a*–52*f* make contact with the brake element 51 and the spool 12 is braked by the centrifugal braking mechanism 23 to prevent a generation of backlash.

In addition, if backlash of the spool 12 is caused by any chance, the problem may be easily dissolved since the first side cover 6 is easily removed due to the bayonet coupling 14.

Also, when a lure is changed to another lure having a different weight, the braking force is adjusted to one of the six levels by rotating the braking knob 70 in accordance with the weight of the lure. In this embodiment, the braking force due to a centrifugal force may be easily adjusted by simply rotating the braking knob 70 which is exposed to outside. Also, since the number of the shifters 52*a*–52*f* which make contact with the brake element 51 is varied when the braking force is adjusted, a distinctive difference in the braking force may be obtained. Moreover, since the state of the three shifters 52*a*, 52*c*, and 52*e* may be changed from the operative posture in which they may make contact with the brake lining 57 of the brake element 51 to the inoperative posture by the switching mechanism 57, the range of the adjustment of the braking force may be changed.

Second Embodiment

Figure 8:
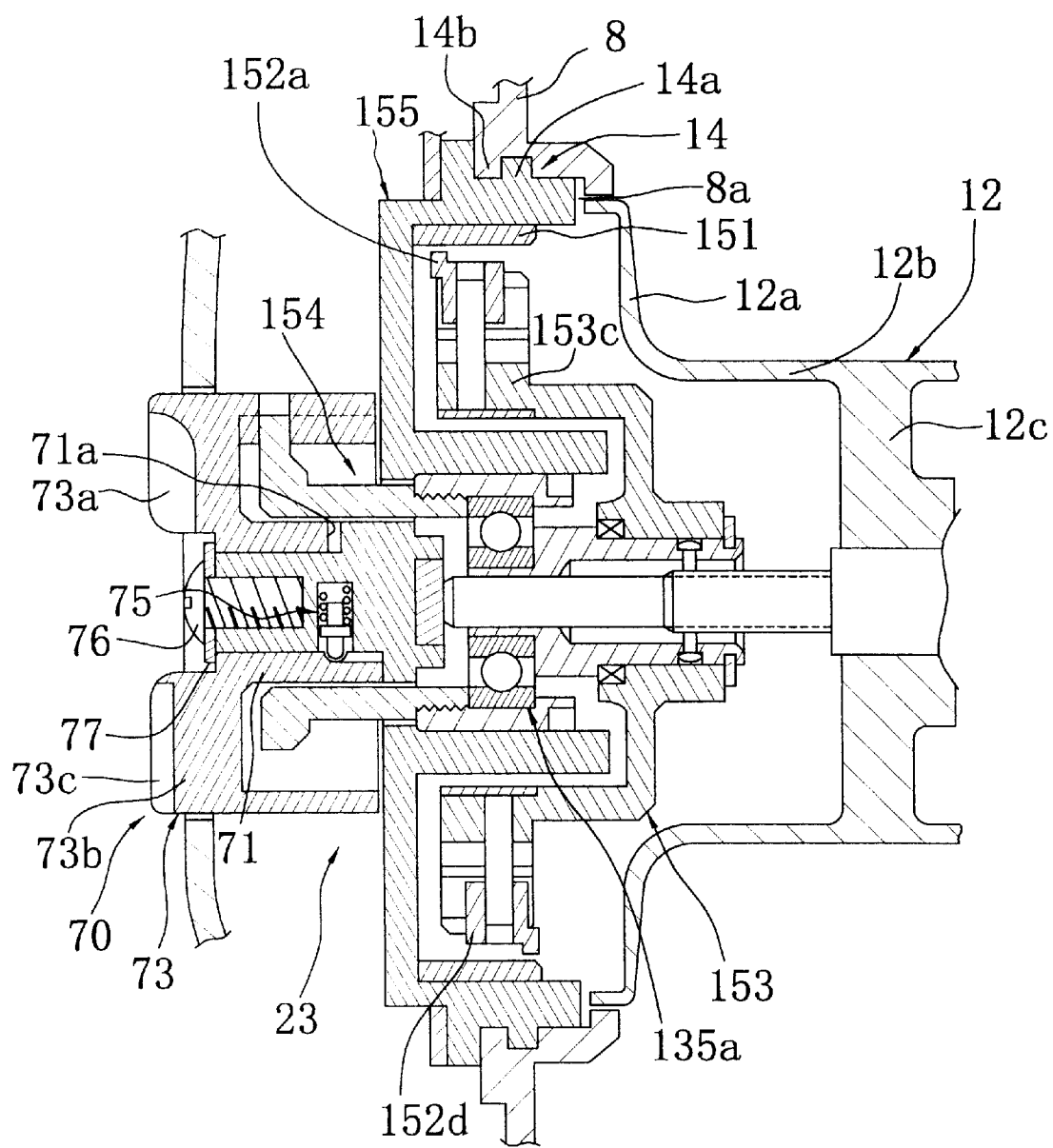
FIG. 8 is a diagram corresponding to FIG. 4 showing a second embodiment.

As shown in FIG. 8, the braking force may be adjusted by moving the rotary member 153, not the brake element 151, in the axial direction. In this embodiment, the rotary member 153 is non-rotatably attached to the spool shaft 16 in a movable manner in the axial direction and the rotary member 153 is rotatably attached to the brake case 155 via the bearing 135*a*. Moreover, in order to move the rotary member 153 smoothly in the spool axial direction, the outer ring of the bearing 135*a* which does not rotate is moved in the spool axial direction by the shifting mechanism 154. Accordingly, the rotary member 153 is moved in the spool axial direction via the bearing 135*a*. The present invention is also applicable to this second embodiment. That is, the structure of the circular plate portion 153*c* of the rotary member 153 and that of the shifters 152*a*–152*f* are substantially the same as those in the previous embodiment. In addition, since the rotary member 153 is moved in the spool axial direction, the brake element 151 is fixed to the brake case 155 in this embodiment.

Third Embodiment

Although the shifters are guided by the guide shafts 256*a*–256*f* in the previous two embodiments, the shifters may be guided in the radius direction by recessed or protruding guiding surfaces.

Figure 9:
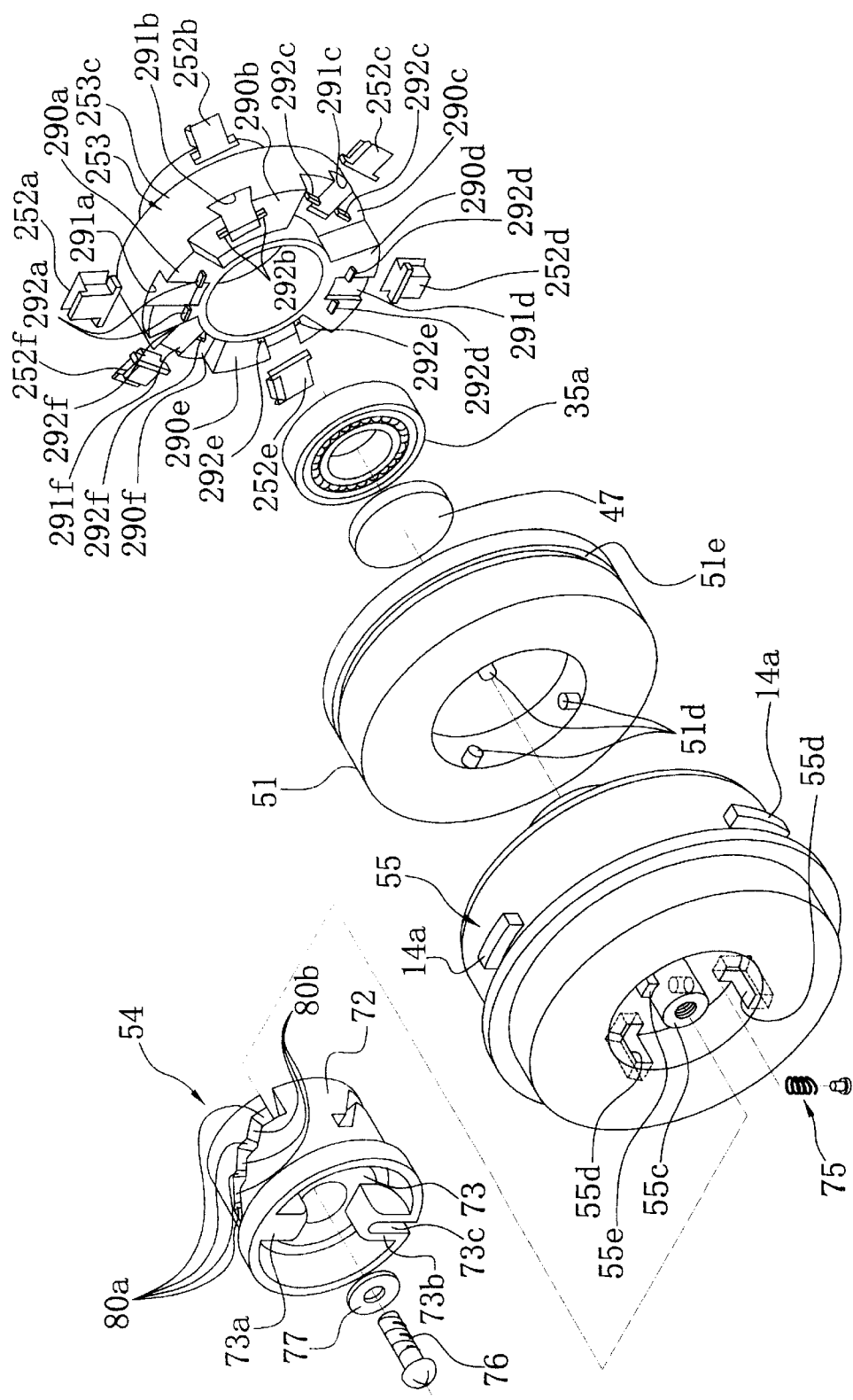
FIG. 9 is a diagram corresponding to FIG. 3 showing a third embodiment.
Figure 10:
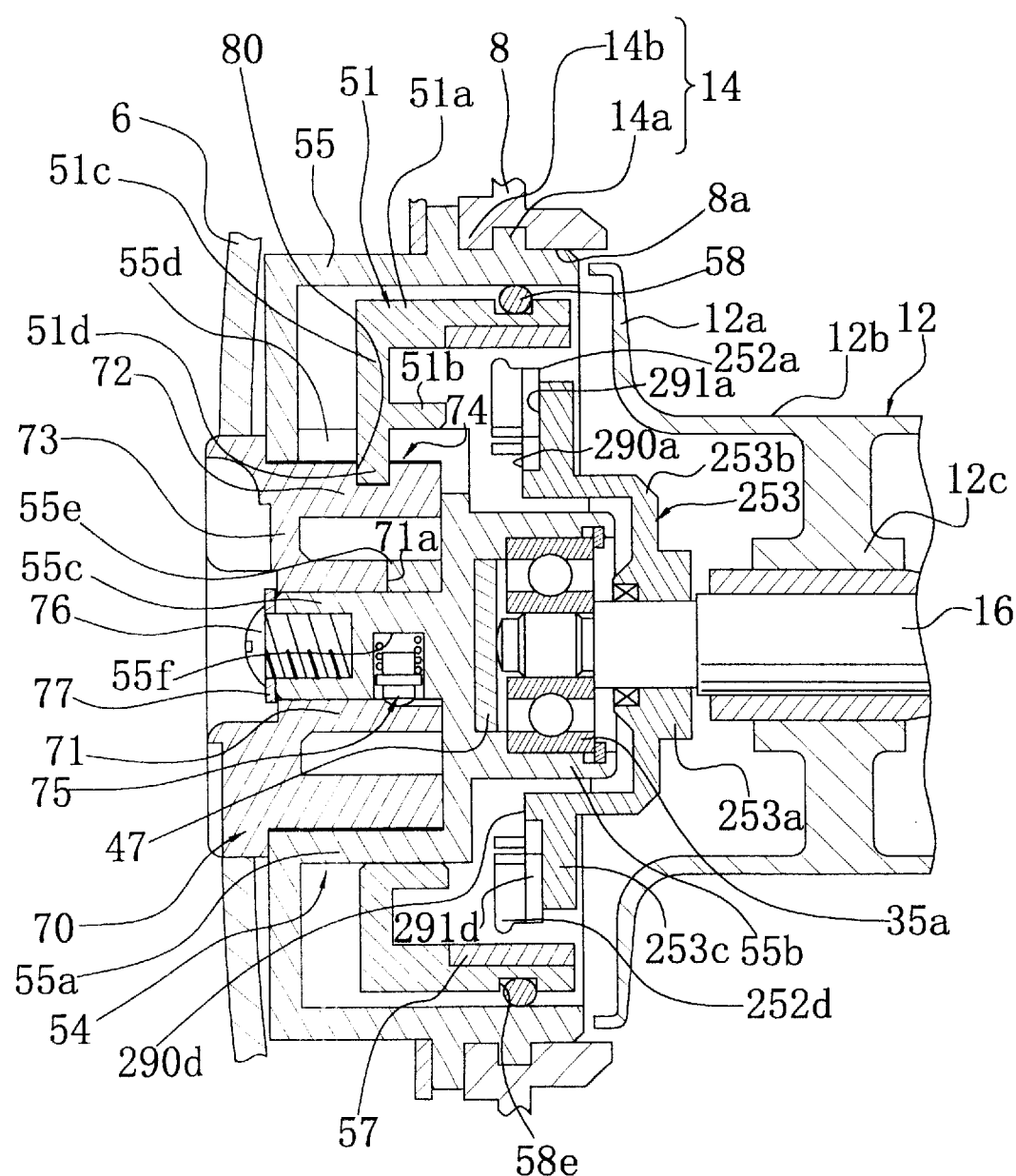
FIG. 10 is a diagram corresponding to FIG. 4 showing the third embodiment.

As shown in FIGS. 9 and 10, six plane surfaces 290*a*–290*f* of a fan shape are formed on an end surface of the circular plate portion 253*c* of the rotary member 253 at different positions in the spool shaft 16 direction with a space between each other in the circumferential direction. Among them, the positions of the plane surfaces 290*a* and 290*d*, 290*b* and 290*e*, and 290*c* and 290*f* in the spool shaft 16 direction are the same. The plane surfaces 290*a* and 290*d* are positioned axially outward most (left-hand side in FIG. 10) and the plane surfaces 290*c* and 290*f* are positioned axially inward most, and the plane surfaces 290*b* and 290*e* are positioned between the two groups. Dovetail grooves 291a–291f as guiding surfaces are formed on the respective plane surfaces 290a–290f in the radius direction. The shifters 252a–252f are guided by the dovetail grooves 291a–291f. A pair of fixing projections 292a–292f for making the shifters 252a–252f inoperative are formed on each of the plane surfaces 290a–290f adjacent to the dovetail grooves 291a–291f so as to project outwardly in the axial direction.

Figure 11:
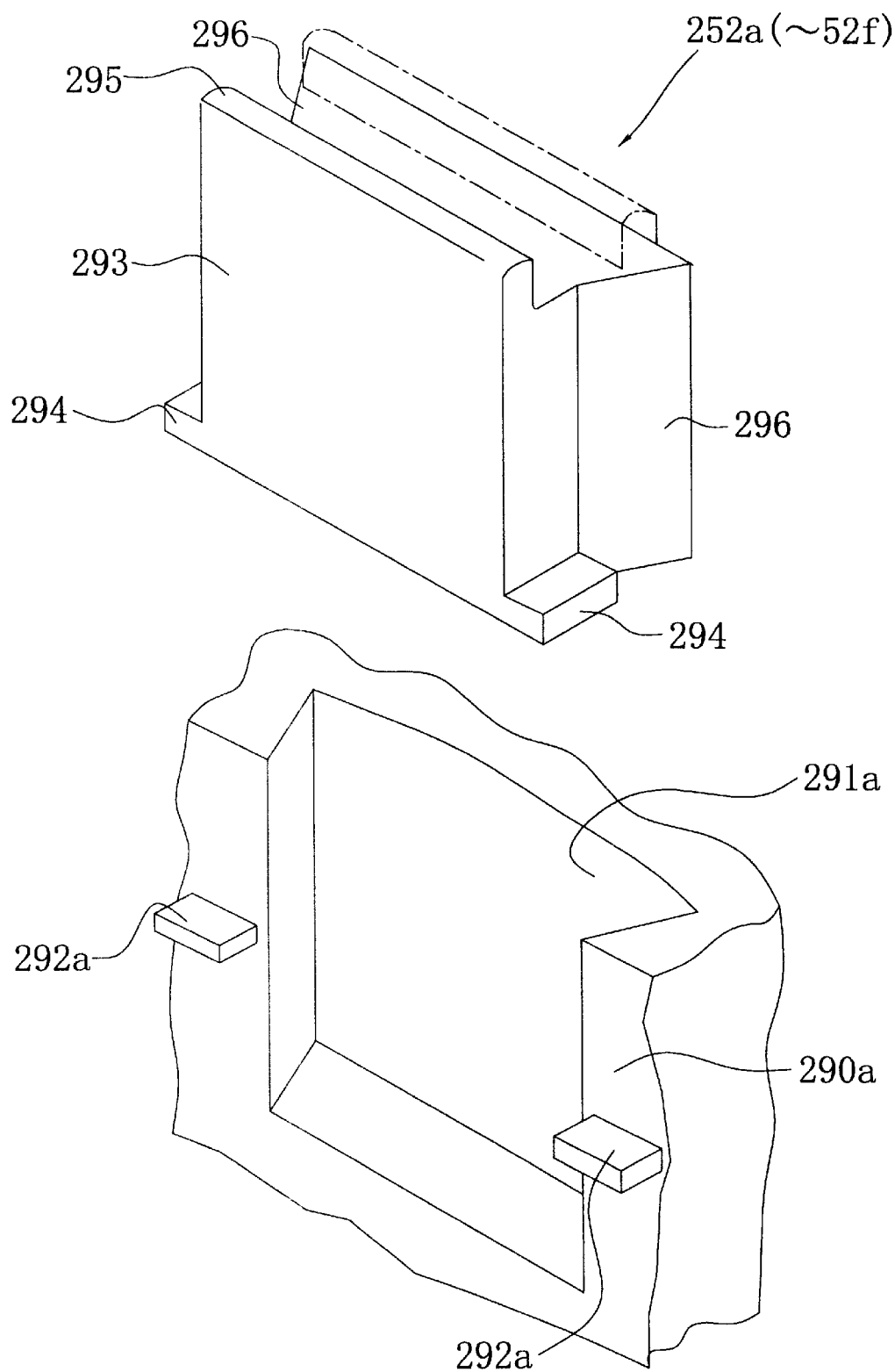
FIG. 11 is perspective views of shifter thereof.

As shown in FIG. 11, each of the shifters 252a–252f includes a main portion 293 of a rectangular solid shape, a pair of shifter projections 294, a contacting portion 295, and an engaging convex portion 296. The pair of the shifter projections 294 are formed on the inner side of the main portion 293 in the radius direction so as to project in the rotary direction. The contacting portion 295 is integrally formed with the main portion 293 on a side end surface in the radius direction so as to project outwardly. The engaging convex portion 296 are formed on both sides of the main portion 293 in the rotary direction. As shown in a solid line in FIG. 11, the contacting portion 295 of the three shifters 252a–252c are formed on the outward end surface in the axial direction. Also, as shown in a two-dotted line in FIG. 11, the contacting portion 295 of the other three shifters 2252d–252f are formed on the inward end surface in the axial direction (the end surface of the engaging convex portion 296). The cross section of the engaging convex portion 296 is formed in a triangular shape so that it may be engaged with the dovetail grooves 291a–291f.

In this configuration, also, the shifters 252a–252f are moved in the radius direction of the spool 12 being guided by the dovetail grooves 291a–291f when the spool 12 rotates. Moreover, when the shifter projections 294 are located inner side of the fixing projections 292a–292f, the shifters 252a–252f are maintained in their inoperative posture and cannot make contact with the brake element 51.

In addition, the shifters may be guided by protuberant guiding surfaces or a hole in the radius direction instead of the guiding surface of the dovetail grooves or the recess in the radius direction.

Fourth Embodiment

Figure 12:
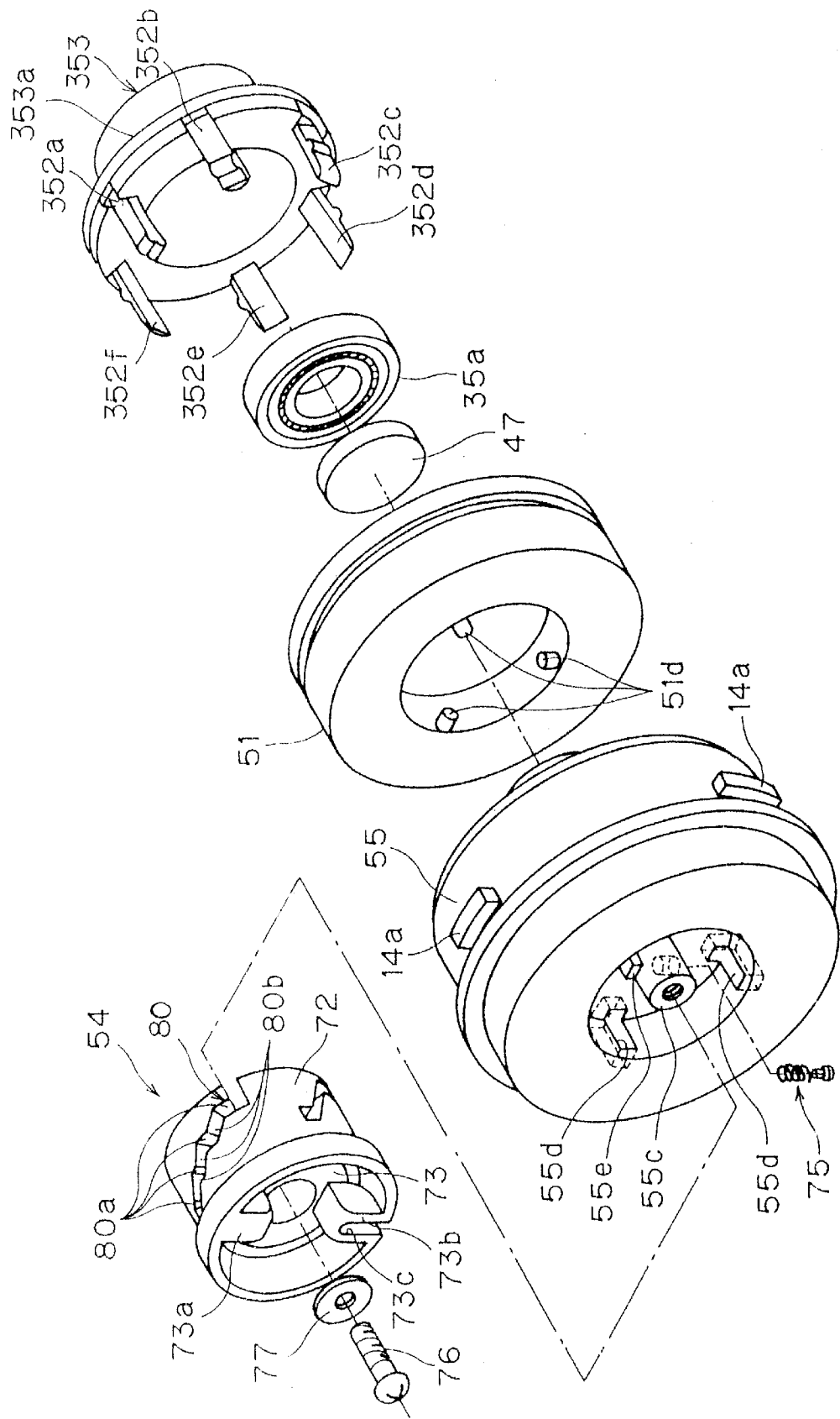
FIG. 12 is a diagram corresponding to FIG. 3 showing a fourth embodiment.
Figure 13:
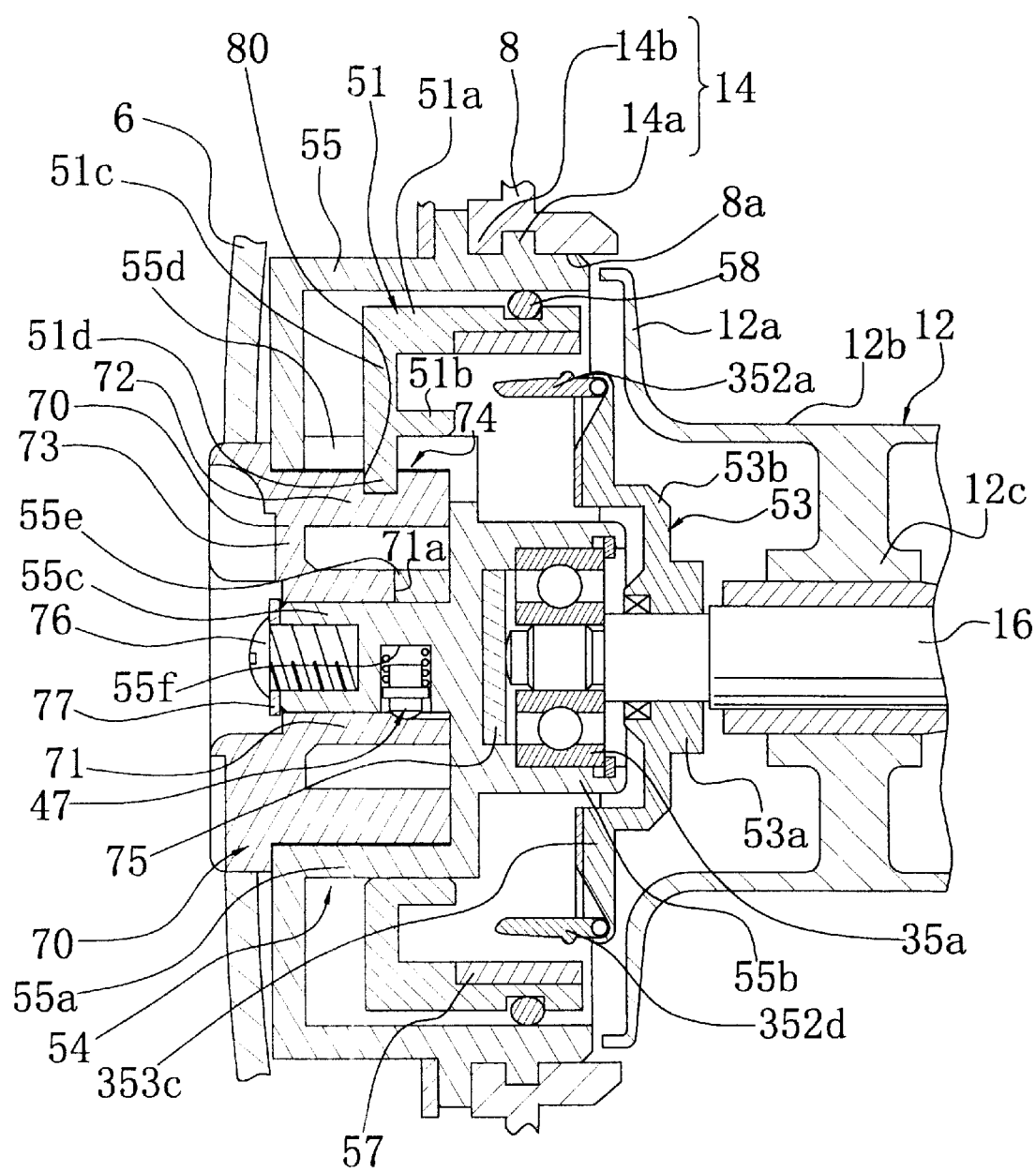
FIG. 13 is a diagram corresponding to FIG. 4 showing the fourth embodiment.

Although the shifters are linearly moved in the radius direction of the spool 12 in the three previous embodiments, the shifters 352a–352f may be fitted to pivot around pivot shafts as shown in FIGS. 12 and 13.

Figure 14:
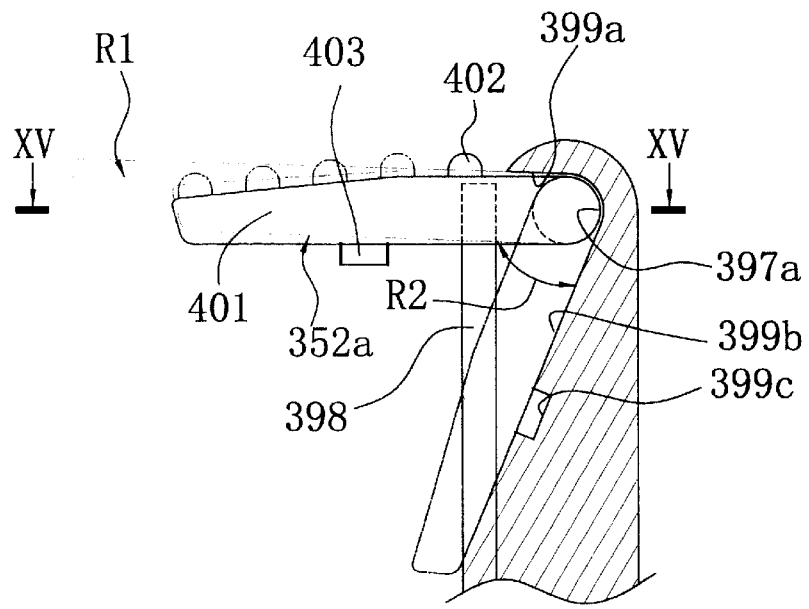
FIG. 14 is a partial cross-sectional view of a shifter in the fourth embodiment.
Figure 15:
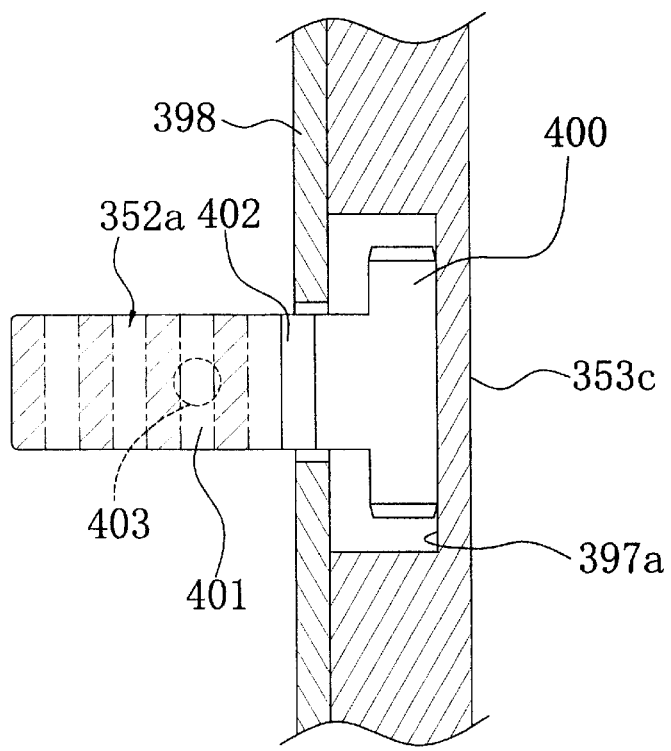
FIG. 15 is a cross-sectional view of FIG. 4 taken along the line X—X.

Six attachment recesses 397a–397f are formed on the side surface of an outer periphery side of the circular plate portion 353c of the rotary member 353 with a space between each other in the circumferential direction. As shown in FIGS. 14 and 15, each of the attachment recesses 397a–397f is a hole having a predetermined length in the chord direction and its bottom surface is of a half circle shape. The shifters 352a–352f are pivotally supported by the attachment recesses 397a–397f so as to pivot around a respective pivot axis in the chord direction. An engaging plate 398 for engaging the shifters 352a–352f is fixed to an opening surface of the attachment recesses 397a–397f by screws. A slant surface 399a of an angle R1 is formed on a side surface (outer periphery side) of each of the attachment recesses 397a–397f. Also, a slant surface 399b of an angle R2 is formed on a side surface (inner peripheral side) thereof. The slant surface 399a on the outer peripheral surface and a slant surface 399c on the inner peripheral surface are formed to restrict the pivotal angle of each of the shifters 352a–352f and to restrict each of the shifters 352a–352f to the inoperative posture. The angle R1 may be between about 3–5 degrees and the angle R2 may be between about 75–90 degrees. The angle R1 is provided so that the end portion of the shifters 352a–352f is placed at a position where it may be incorporated to the brake lining 57 which is fixed to the inside of the brake element 51. An engaging recess 399c of a circular hole shape is formed on the slant surface 399b of the angle R2 which is formed on the side surface of the inner side. The engaging recess 399c is provided for maintaining the shifters 352a–352f in the inoperative posture.

The shifters 352a–352f are pivotally attached to the attachment recesses 392a–352f of the rotary member 353. As shown in FIGS. 14 and 15, each of the shifters 352a–352f includes a shaft portion 400, a pivot portion 401, contacting portions 402, and an engaging projection 403. The shaft portion 400 is attached to the attachment recesses 397a–397f. The pivot portion 401 extends outwardly in the spool axial direction from the shaft portion 400. The contacting portions 402, are formed on the outer surface of the pivot portion 401 so as to project outwardly. The engaging projection 403 is formed on the inner side of the pivot portion 401.

As shown in FIG. 14, the positions of the contacting portions 402 differ in the spool axial direction. Note that no contacting portion 402 is formed on one of the six shifters 352a–352f in this embodiments. Also, the contacting portions 402 are formed with substantially the same interval between each other. The outer side surface of the pivot portion 401 is slightly curved towards inside from a middle portion thereof. This is to prevent the end portion of the shifters 352a–352f from sticking out of the brake lining 57 of the brake element 51 when the shifters 352a–352f are pivoted outwardly. The spool 12 is braked when the contacting portions 402 make contact with the brake lining 57. When the engaging recess 399c is engaged with the engaging projection 403, the state of the shifters 352a–352f is maintained in the inoperative posture.

In the centrifugal braking mechanism 23 having the above-mentioned structure, the shifters 352a–352f pivot around the shaft portion 400 outwardly in the radius direction due to the rotation of the rotary member 353 when the spool 12 rotates. Then, the spool 12 is braked when the contacting portions 402 of the shifters 352a–352f in the operative posture make contact with the brake lining 57. At that time, the number of the contacting portions 402 that make contact with the brake lining 57 varies depending on the position of the brake element 51 in the axial direction. Accordingly, more precise adjustment of the braking force may be achieved. Moreover, the range of the adjustment of the braking force may be changed, in the same manner as in the previous embodiments, by switching the state of the shifters 352a–352f to the operative posture or the inoperative posture.

Fifth Embodiment

Although all the braking characteristic of the moving members are same in the above four embodiments, the braking characteristic of the moving members may be different.) As shown in FIGS. 17 to 20, the shifters 552a–552f are attached to guide shafts 556a–556f disposed on the rotary member 53 in a movable manner in the radius direction (axial direction of the guide shafts 56a–56f).

The rotary member 53 is non-rotatably attached to the spool shaft 16 in a non-movable manner in the axis direction by a suitable means such as serration and rotates together with the spool 12. The rotary member 53 includes a boss portion 53a, a cylindrical member 53b, and a circular plate member 53c. The boss portion 53a is fixed to the spool shaft 16. The cylindrical member 53b extends outwardly from the boss portion 53a. The circular plate member 53c extends outwardly in the radius direction from the outer peripheral surface of the cylindrical member 53b. The circular plate member 53c is disposed outside of the bearing accommodating portion 55b in the radius direction.

Figure 20:
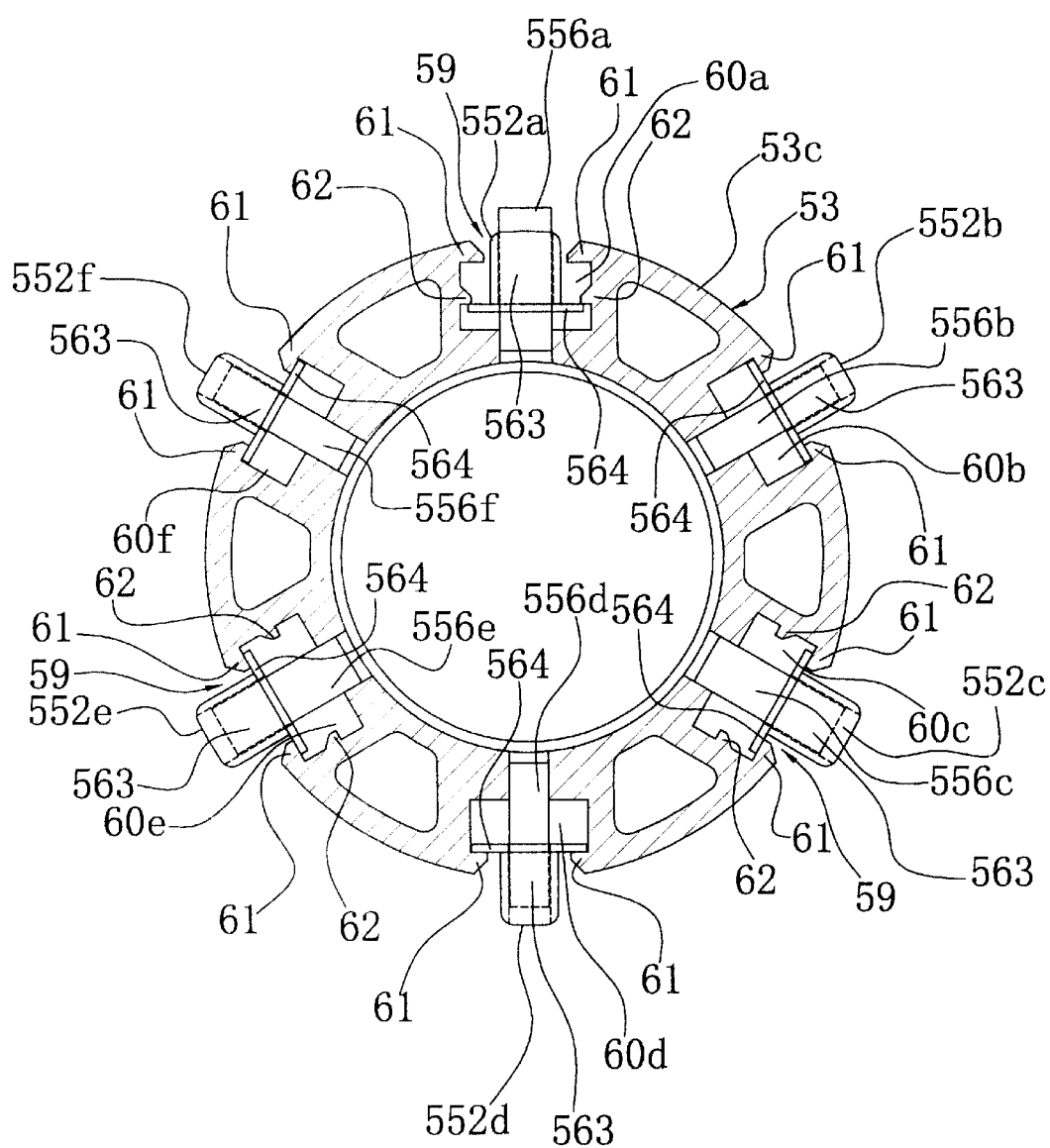
FIG. 20 is a diagram corresponding to FIG. 6 showing the fifth embodiment.

As shown in FIG. 20, six substantially rectangular shaped recesses 60a–60f which open towards the outer peripheral surface side are formed with the circular plate member 53c of the rotary member 53 with a space between each other in the circumferential direction. The guide shafts 556a–556f are radially fitted to the recesses 60a–60f. Among them, three recesses 60a, 60c, and 60e have different structure as compared with that of three remaining recesses 60b, 60d, and 60f. That is, the recesses having a different structure are disposed alternately. Each of the recesses 60a, 60c, and 60e has a pair of stop projections 61 at the opening portion thereof which protrudes so as to be approaching to each other in the circumferential direction. Also, each of the recesses 60a, 60c, and 60e has a pair of fixing projections 62 at an inner peripheral side of the stop projections 62 with a space between each other. The fixing projections 62 form the switching mechanism 59 which switches the state of the shifters 552a, 552c and 552e from an operative posture to an inoperative posture or vice versa. On the other hand, each of the recesses 60b, 60d, and 60f has only the stop projections 61. For this reason, no switching mechanism 59 is fitted to the recesses 60b, 60d, and 60f.

Figure 19A:
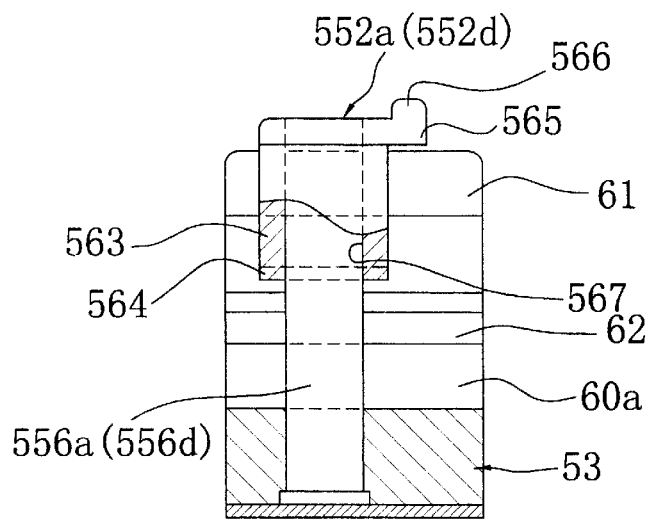
FIGS. 19A to 19C are diagrams corresponding to FIGS. 5A to 5C showing the fifth embodiment.
Figure 19B:
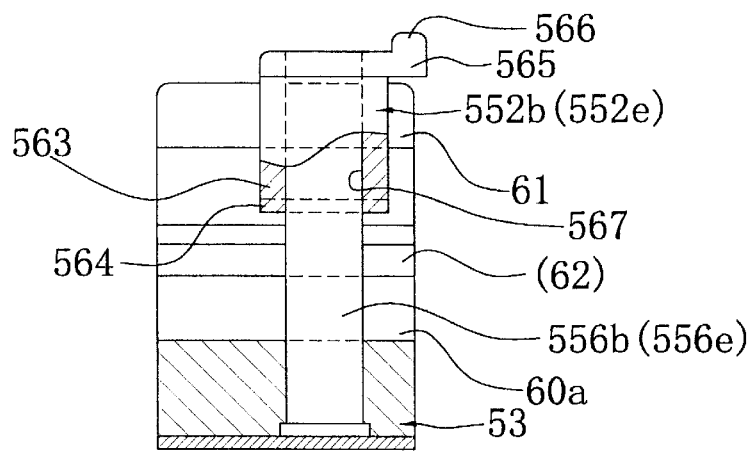
Figure 19C:
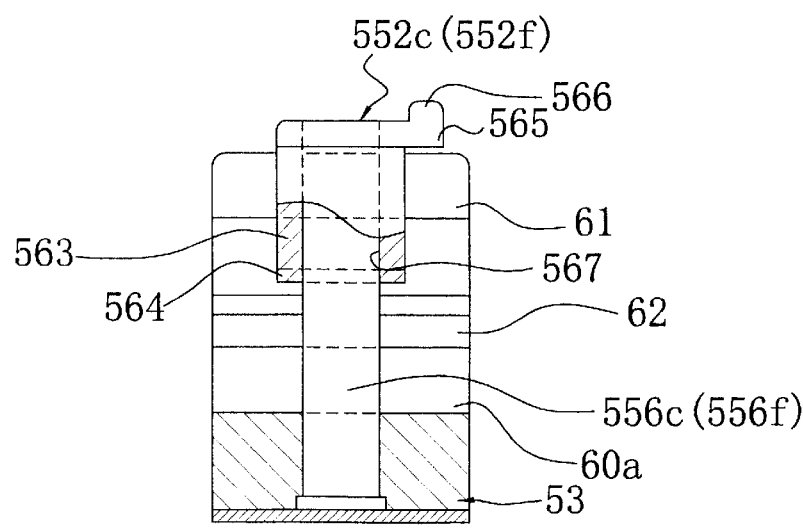
Figure 21A:
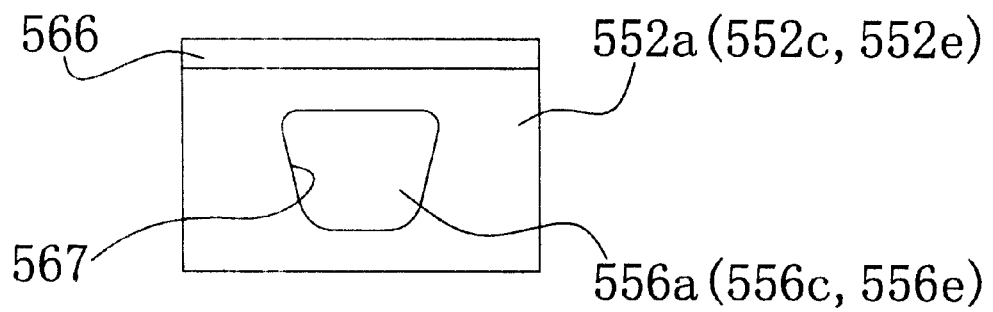
FIGS. 21A and 21B are plan views showing the attachment states of the shifters showing the fifth embodiment.
Figure 21B:
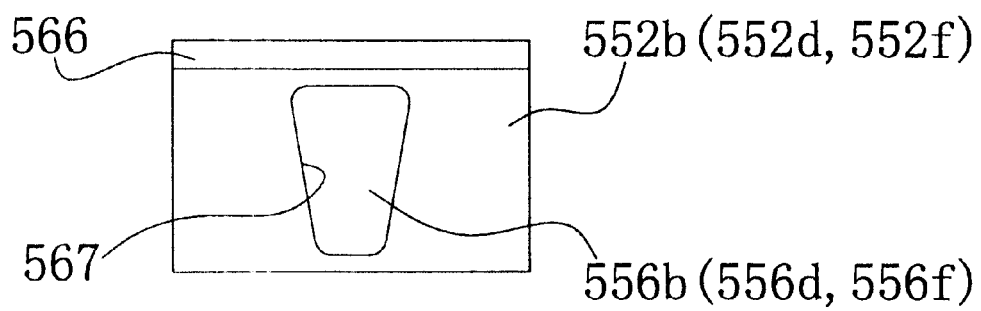

The guide shafts 556a–556f are disposed on the bottom portions of the recesses 60a–60f in the radius direction. The guide shafts 556a, 556c, and 556e and the remaining guide shafts 556b, 556d, and 556f are shaft members of a trapezoidal shape having a different cross sectional shape. As shown in FIG. 21A, the cross section of the guide shafts 556a, 556c, and 556e is a horizontally longer trapezoid which is non-symmetrical to a surface orthogonal to the spool shaft 16. As shown in FIG. 21B, the cross section of the remaining guide shafts 556b, 556d, and 556f is a vertically longer trapezoid which is non-symmetrical to a surface orthogonal to the spool shaft 16. Also, as shown in FIG. 19A, the guide shafts 556a and 556d are disposed most outwardly in the spool axial direction (left-hand side in FIG. 19) and, as shown in FIG. 19B, the guide shafts 556b and 556e are disposed most inwardly in the spool axial direction (right-hand side in FIG. 19). As shown in FIG. 19C, the guide shafts 556c and 556f are disposed on middle positions between them. That is, the six guide shafts 556a–556f are disposed on three positions shifted in the spool axial direction.

The shifters 552a–552f are attached to the guide shafts 556a–556f in a slidable manner in the spool radius direction (the guide shaft axial direction). Different numbers of the shifters 552a–552f make contact with the brake lining 57 of the brake element 51 when the brake element 51 moves in the spool axial direction. The six shifters 552a–552f are members having substantially rectangular solid shape and made of a synthetic resin having elasticity. Among them, the mass of the shifters 552a, 552c, and 552e is larger than the mass of the remaining shifters 552b, 552d and 552f. For this reason, the centrifugal force applied to the shifters 552a, 552c and 552e becomes larger than the centrifugal force applied to the shifters 552b, 552d and 552f and, hence, the braking force becomes larger.

As shown in FIGS. 19 and 20, each of the shifters 552a–552f is integrally formed with a main portion 563 of a rectangular solid shape, which is guided by a respective guide shaft 556a–556f, at an inner side end portion of the main portion 563(a lower end portion in FIG. 19). Each of the shifters 552a–552f includes a pair of shifter projections 564 projecting from the main portion 563 in both rotary directions (directions orthogonal to the surface of FIG. 19) and a contacting portion 565 which is integrally formed with an outer end portion of the main portion 563 (an upper side end portion in FIG. 19) and projecting from the main portion 563 in a inner side spool axial direction (right hand side direction in FIG. 19).

A guide hole 567 penetrates the main portion 563 in the radius direction of the spool shaft 16 and the guide shafts 556a–556f are fit to the guide hole 567 so that the shifters 552a–552f are guided by the guide shafts 556a–556f in a movable manner in the radius direction. Also, the cross section of the guide hole 567 for the shifters 552a, 552c and 552e is formed so as to be a horizontally longer trapezoid which is the same shape as the cross section of the guide shafts 556a, 556c and 556e. The cross section of the guide hole 567 for the remaining shifters 552b, 552d and 552f is formed so as to be a horizontally longer trapezoid which is the same shape as the cross section of the remaining guide shafts 556b, 556d and 556f. For this reason, each of the shifters 552a–552f may be attached to the corresponding guide shaft 556a–556f and a mistake in combination thereof may be prevented. Moreover, since each cross section has a trapezoid shape, the position of the shifters 552a–552f may be determined in a predetermined direction with respect to the guide shafts 556a–556f and the rotation thereof may be stopped.

The shifter projections 564 project so as to be engaged with the pair of the fixing projections 62 and the stop projections 61. When the shifter projections 564 are placed between the fixing projections 62 and the stop projections 61, a detachment of the shifters 552a–552f is prevented by being engaged with the shifter projections 564. The state of the shifters 552a, 552c and 552e placed at this position is called the operative posture. Also, when the shifters 552a, 552c and 552e are placed more inwardly than the fixing projections 62 by being pushed inwardly in the radius direction, the shifter projections 564 are engaged with the fixing projections 62 and the shifters 552a, 552c and 552e cannot make contact with the brake element 51. This positional configuration thereof is called the inoperative posture. The switching mechanism 59 is formed by the fixing projections 62 and the shifter projections 564. For this reason, the number of the shifters 552a, 552c and 552e which may make contact with the brake element 51 can be adjusted.

A contact nub 566 protrudes outwardly in the radius direction from one of the pair of the contacting portions 565. The contact nub 566 is a recess which makes contact with an inner surface (a braking surface) of the brake lining 57 of the brake element 51 and formed in an arc shape in the circumferential direction (direction orthogonal to the surface of the figure) so as to be fit with the inner surface of the brake element. The contact nub 66 of the shifters 552a–552f may make contact with the brake element 51 at three different positions in the spool axial direction.

Accordingly, in the fifth embodiment, the braking force may be adjusted in three levels. The three-level braking force may be minutely changeable by such factors as a direction (i.e., attaching state) of the contact nub 66 of the shifters 552a–552f or the number of the shifters 552a–552f which may make contact with the brake element 51.

In this embodiment, the number of the shifters 552a–552f that make contact with the brake element 51 changes, for instance, in order of 6, in which all of the shifters 552a–552f make contact, then 4, in which the shifters 552a, 552c, 552d and 552f make contact, and finally 2, in which the shifters 52a and 52c make contact, when the brake element 51 moves in the axial direction. As mentioned above, the number of the shifters 552a–552f which make contact with the brake element 51 at each level is freely changeable according to the preference of a fisher man or the type or the weight of the lure used. In addition, since the state of the shifters 552a, 552c and 552e may be changeable from the operative posture to the inoperative posture or vice versa, the braking force may be adjusted in a smaller range. For this reason, the range of the adjustment of the braking force may be varied.

Figure 17:
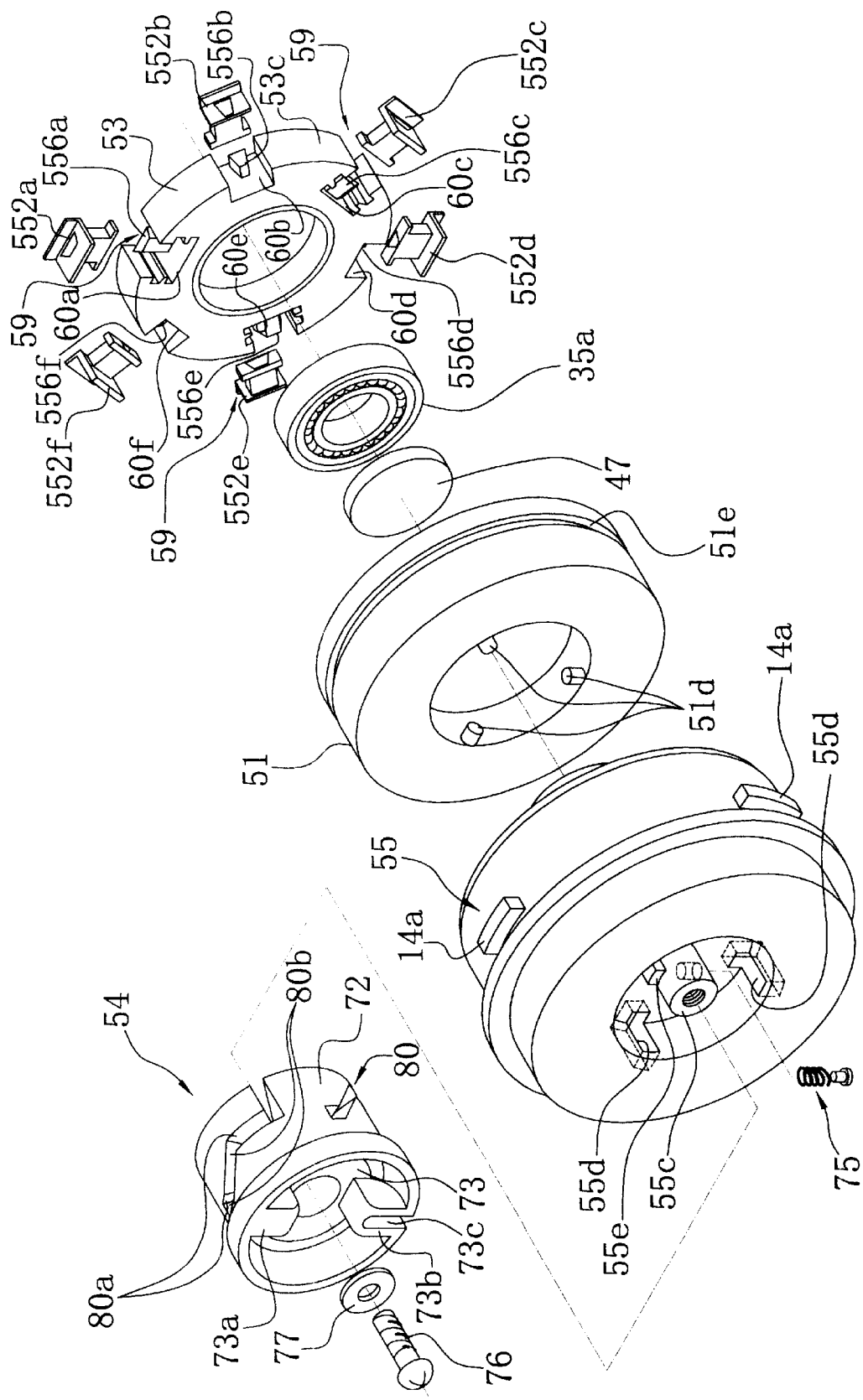
FIG. 17 is a diagram corresponding to FIG. 3 showing the fifth embodiment.
Figure 18:
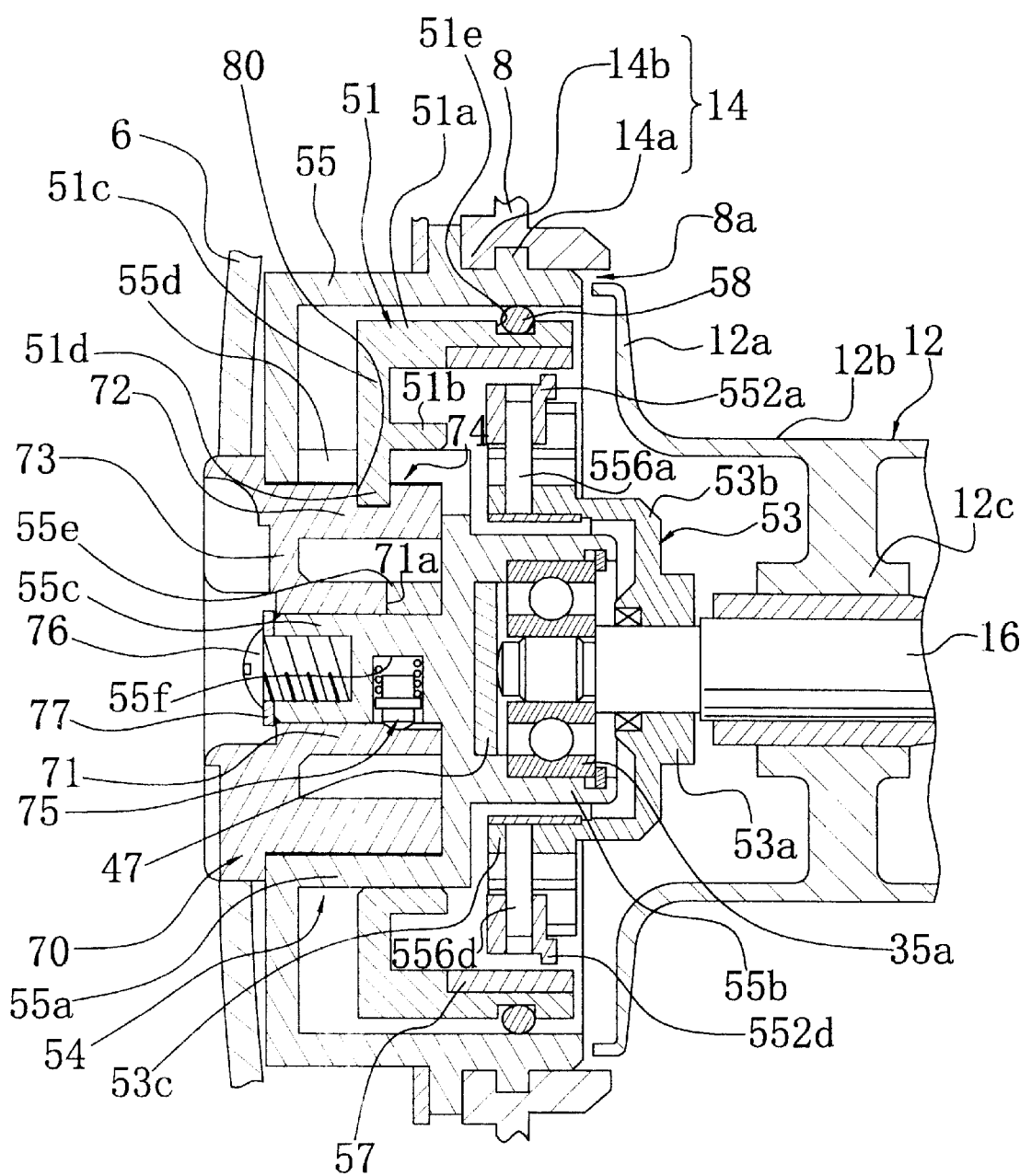
FIG. 18 is a diagram corresponding to FIG. 4 showing the fifth embodiment.

As shown in FIGS. 17 and 18, the shifting mechanism 54 includes the braking knob 70 and a rotary cam mechanism 74. The braking knob 70 is fitted to the reel body 1 in a rotatable manner. The rotary cam mechanism 74 converts the rotation of the braking knob 70 to the movement in the spool axial direction and reciprocates the brake element 51.

The braking knob 70 is attached to the knob supporting portion 55c of the brake case 55 and fixed in a rotatable manner by a bolt 76 which is screwed in an end of the knob supporting portion 55c via a washer 77. The braking knob 70 includes a boss portion 71, a cam portion 72, and an handle 73. The boss portion 71 has a cylindrical shape and is attached to the knob supporting portion 55c. The cam portion 72 has a cylindrical shape and is disposed to the outer peripheral side of, and at a spacing from, the boss portion 71. The handle 73 has a circular plate shape and connects the boss portion 71 with the cam portion 72. A positioning mechanism 75 for determining the position of the braking knob 70 at the three positions in the circumferential direction is placed between the boss portion 71 and the knob supporting portion 55c. The positioning mechanism 75 is located in the circular hole 55f. A notch 71a is formed at the end of the boss portion 71 in the circumferential direction. The range of the rotation of the braking knob 70 may be restricted to, for instance, about 90 degrees by engaging the notch 71a with the rotation restriction projection 55e formed with the knob supporting portion 55c. Three cam grooves 80 penetrate through the cam portion 72 in the radius direction with a space between each other in the circumferential direction to form the rotary cam mechanism 74.

Each of the cam grooves 80 includes three braking slots 80a and slant grooves 80b and formed in a slant manner mainly in the cam portion 72. Each of the three braking slots 80a has a predetermined length in the circumferential direction with equal space between each other and is formed at positions different in the axial and circumferential directions. The slant grooves 80b connect each of the braking slots 80a.

Figure 16:
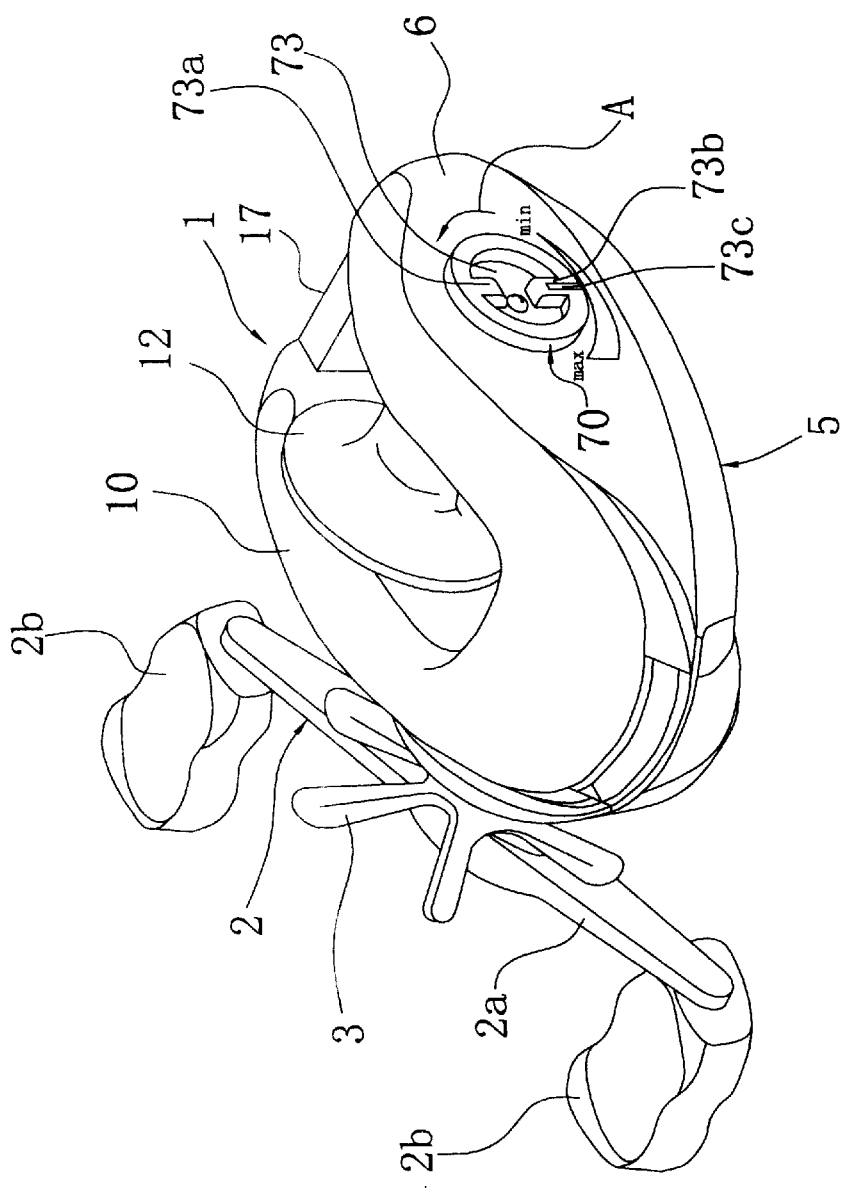
FIG. 16 is a diagram corresponding to FIG. 1 showing a fifth embodiment.

As shown in FIGS. 16 and 17, the handle 73 includes two protruding portions 73a and 73b that protrude outwardly. A pointer 73c is formed as a groove on the protruding portion 73b in the radius direction. As shown in FIG. 16, letters of 'min' and 'max' are marked on the first side cover 6 around the pointer 73c so that the level of the braking force may be indicated by the position of the pointer 73c.

The rotary cam mechanism 74 includes three cam pins 51d protruding from the inner surface of the brake element 51 and the cam grooves 80 that are engaged with the cam pins 51d. By the engagement of the cam pins 51d with the cam grooves 80, the rotation of the braking knob 70 is converted to the movement of the rotary cam mechanism 74 in the axial direction. Also, when the cam pins 51d are engaged with the braking slots 80a located at the three positions, the positions of the rotary cam mechanisms 74 are determined at the three positions in the axial direction.

Figure 22:
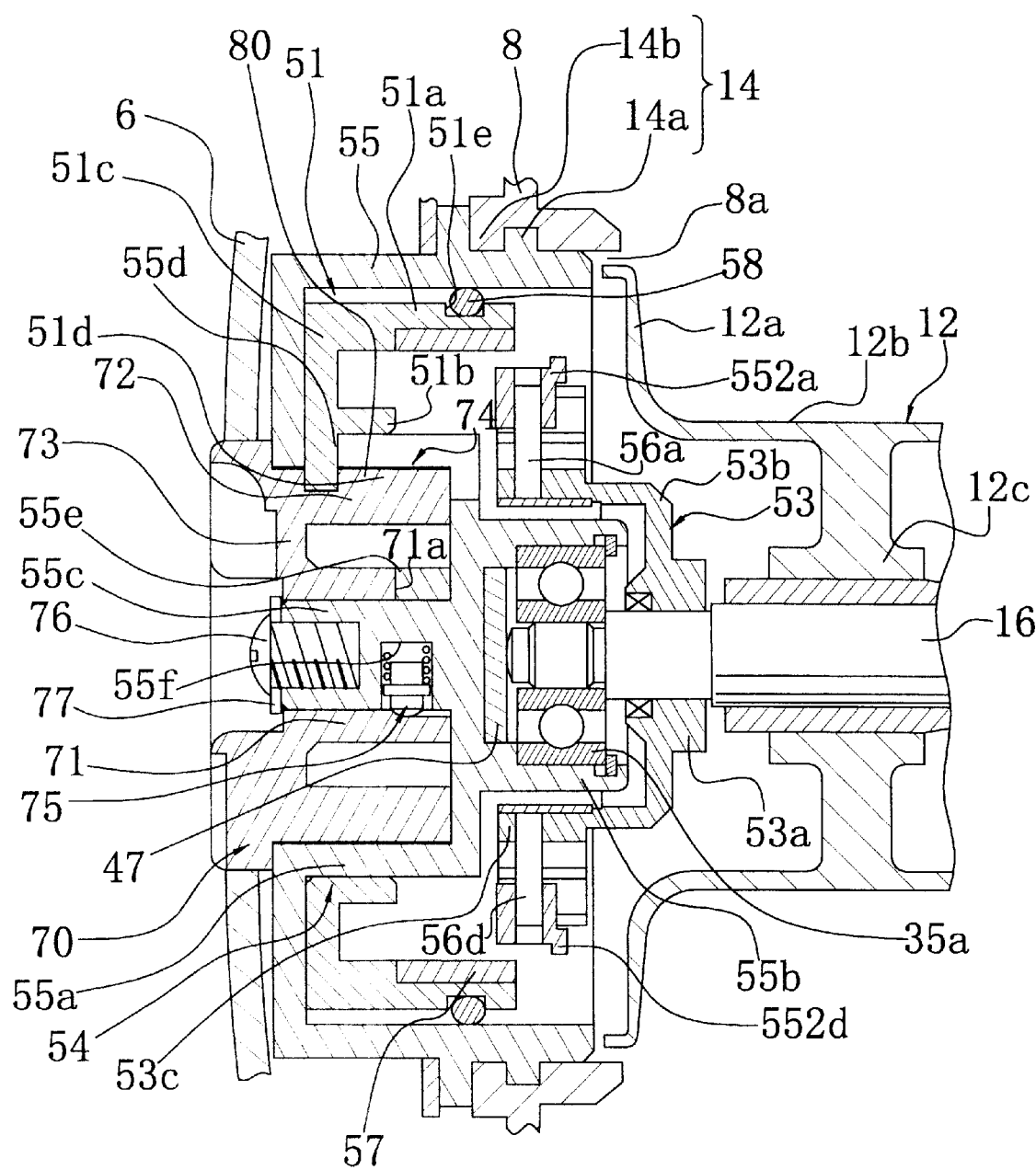
FIG. 22 is a diagram corresponding to FIG. 7 showing the fifth embodiment.

At this stage, when the cam pin 51d is engaged with the braking slot 80a at the most further end (right hand side in FIG. 17), the brake element 51 is advanced and placed at a position closest to the spool 12 shown in FIG. 4 and the number of the shifters 52a–52f which make contact with the brake lining 57 of the brake element 51 reaches the maximum and, hence, the braking force also reaches its maximum point. On the other hand, when the cam pin 51d is engaged with the braking slot 80a at the most base end (left hand side in FIG. 17), the brake element 51 is receded to a position shown in FIG. 22 to be placed at a position furthermost from the spool 12 and the number of the shifters 552a–552f which make contact with the brake element 51 is minimized and, hence, the braking force is also minimized.

Reel Operation

In a normal state, the clutch yoke 40 is pressed inwardly to achieve a clutch-on state. As a result, the rotational force from the handle 2 is transmitted to the spool 12 via the handle shaft 30, the main gear 31, the pinion gear 32 and the spool shaft 16 to rotate the spool 12 in the line reeling-in direction. At this time, although a centrifugal force is applied to the shifters 52a–52f of the centrifugal braking mechanism 23 to move the shifters 52a–52f outwardly in the radius direction, the braking force does not become so large since the rotation speed of the spool 12 is slow and, hence, it does not interfere with the rotation of the handle 2. However, if it is necessary to reduce the braking force, the braking knob 70 may be rotated so that the brake element 51 is placed at a position at which the braking force is the weakest as shown in FIG. 20.

When a fishing line is cast, the braking force is adjusted to prevent backlash by rotating the braking knob 70. When the braking knob 70 is rotated in the direction indicated by an arrow A shown in FIG. 16, the brake element 51 is receded from the spool 12 by the rotary cam mechanism 74. Accordingly, the number of the shifters 552a–552f which make contact with the brake element 51 is gradually decreased and, hence, the braking force is gradually attenuated. When the braking knob 70 is rotated to the position where the pointer 73 indicates the "min", the brake element 51 is placed at the position shown in FIG. 22 and the braking force is minimized.

Then, the clutch operation lever 17 may be pushed downwardly. The clutch yoke 40 is moved outwardly according to the movement of the clutch operation lever 17, and the pinion gear 32 is also moved in the same direction. As a result, the clutch is entered to a clutch-off state. In the clutch-off state, the rotation from the handle shaft 30 is not transmitted to neither the spool 12 nor the spool shaft 16, and the spool 12 may freely rotate. When a fishing rod is swung in the clutch-off state so that a reel is inclined in the axis direction in order for the spool shaft 16 to face a vertical surface while thumbing the spool using a thumb on the clutch operation lever 17, a lure is cast and the spool 12 rotates vigorously in the line-releasing direction.

In this state, the spool shaft 16 is rotated in the line-releasing direction by the rotation of the spool 12 and the rotation is transmitted to the rotary member 53. When the rotary member 53 is rotated, the shifters 552a–552f make contact with the brake element 51 and the spool 12 is braked by the centrifugal braking mechanism 23 to prevent a generation of a backlash.

In addition, if a backlash of the spool 12 is caused by any chance, the problem may be easily dissolved since the first side cover 6 is easily removed due to the bayonet coupling 14.

Also, when a lure is changed to another lure having a different weight, the braking force is adjusted by rotating the braking knob 70 in accordance with the weight of the lure. In this embodiment, the braking force due to a centrifugal force may be easily adjusted by simply rotating the braking knob 70 which is exposed to outside. Also, since the state of the three shifters 552a, 552c, and 552e may be changed from the operative posture in which they may make contact with the brake lining 57 of the brake element 51 to the inoperative posture in which no contact is made or vice versa by the switching mechanism 57, the range of the adjustment of the braking force may be changed.

In the centrifugal braking mechanism 23 for a dual-bearing reel, the mass of the three shifters 552a, 552c, and 552e and that of the remaining three shifters 552b, 552d, and 552f are different. That is, the braking characteristic of them are different. Accordingly, the braking force may be adjusted by these shifters 552a–552f.

Also, the cross section of the guide shafts 556a, 556c, and 556e is a horizontally longer trapezoid and that of the remaining guide shafts 556b, 556d, and 556f is a vertically longer trapezoid. Since the shape of the cross section of both are different, a mistake in combining the shifters 552a–552f with the guide shafts 556a–556f may be prevented.

Other Embodiments (a) Although the brake element 51 is moved by the rotary cam mechanism 74 in the above First to Fourth embodiments, it may be moved by using other converting mechanisms such as screws.

(b) Although the state of the three shifters are switchable in the above first, second and fifth embodiments, all of the shifters may be made switchable. Also, although all of the shifters are switchable in the third and fourth embodiments, only a part of them may be made switchable.

(c) Although the contacting positions to the brake element are made changeable by uniting the structure of the three shifters and changing the attachment direction in the above-mentioned first and second embodiments, it is possible to change the contacting position of each of the shifters.

(d) Although the pivotal axis is provided along the chord direction of the rotary member 53 in the above-mentioned fourth embodiment, the direction of the pivotal axis is not limited to the chord direction and may be in the spool axial direction or directions crossing such directions.

Figure 23:
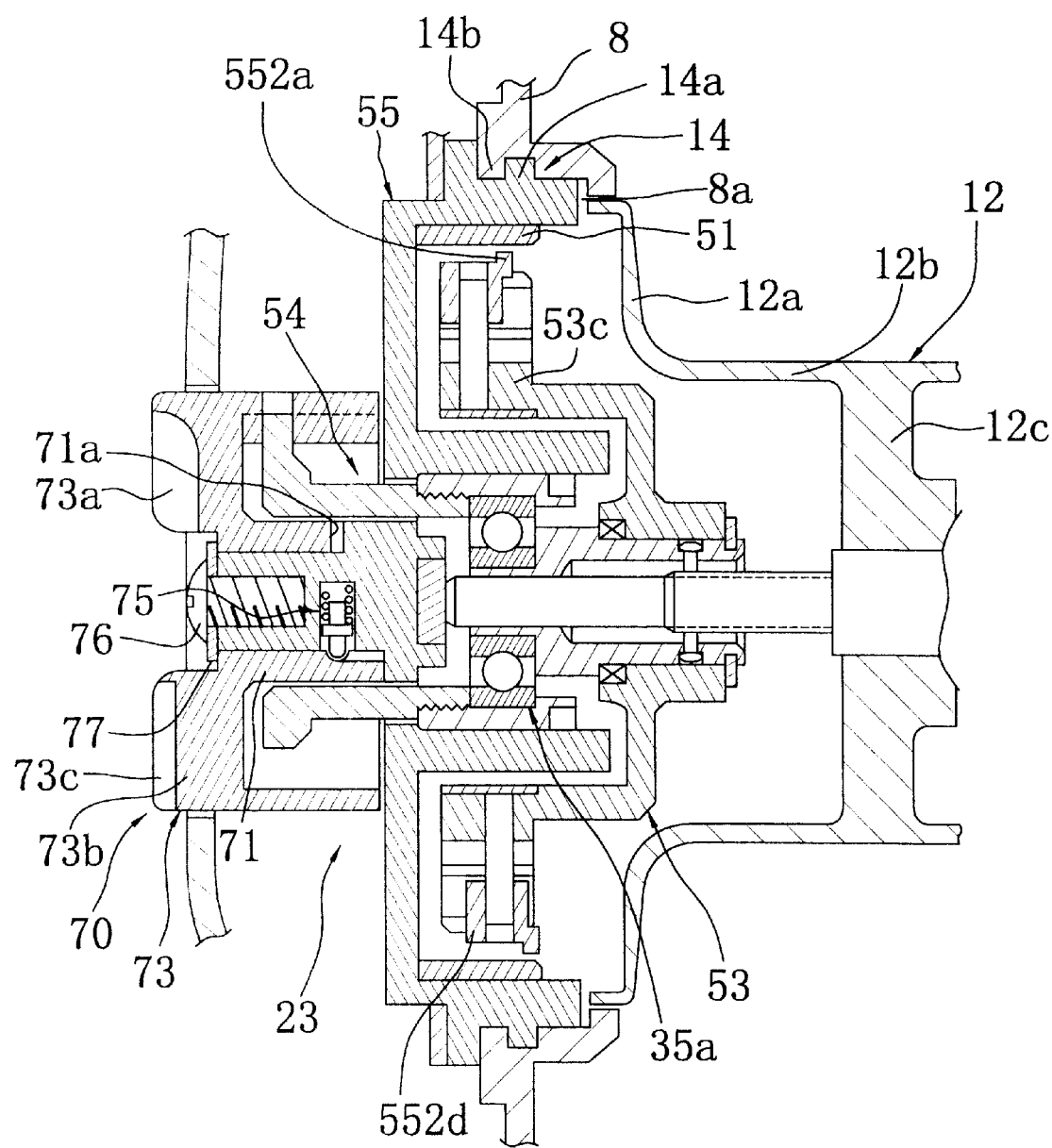
FIG. 23 is a diagram corresponding to FIG. 8 showing a modification of the fifth embodiment.

(e) As shown in FIG. 23, the braking force may be adjusted by using a structure in which the rotary member 553, not the brake element 551, is moved in the axial direction similar to the second embodiment.

(f) Although the rotary member is fixed to the spool shaft 16 in the above embodiments, it may be fixed to the spool 12.

(g) Although the mass of the three shifters 552a, 552c, and 552e is different from the mass of the remaining three shifters 552b, 552d, and 552f in order to obtain different braking characteristics in the fifth embodiment, materials of the shifters and so forth may be changed to obtain a different frictional coefficient so that different braking characteristic may be attained. Note that combinations of the braking characteristics of the shifters 552a–552f may be optionally set.

(h) Although the cross section of the three guide shafts 556a, 556c, and 556e is a horizontally longer trapezoid and that of the remaining three guide shafts 556b, 556d, and 556f is a vertically longer trapezoid in the fifth embodiment, the shape of the cross section is not limited and any shape is acceptable as long as they are inconsistent with each other.

(i) Although the brake element 51 is fixed to the brake case 55 of the reel body 1 in the above embodiments, the present invention is not limited to this type. The present invention may also be applied to, for instance, one in which a brake element 51 rotates in a state a braking force is applied a reel body 1 as disclosed in Japanese Laid-Open patent application No. 5-68455.

According to the present invention, the shifters are attached to the rotary member, not the guide shafts that penetrate the spool shaft, which rotates together with the spool. For this reason, the shifters may be shifted in the rotational axis direction in a minute manner and, hence, the braking force may be adjusted in an accurate manner. Also, it is possible not only to vary the number of the shifters that make contact with the brake element by changing the position of the shifters in the rotational axis direction but also to change only the position of the shifters in the axial direction at which they make contact with the brake element. In this case, the braking force may further be adjusted in a minute manner without depending on the position of the shifters in the rotational axis direction. Moreover, since the state of the shifters may be switched to an inoperative posture or an operative posture by using the switching means, the maximum braking force, the minimum braking force, or the rate of change in the braking force may be varied. For this reason, the range of adjustment in the braking force may be changed and the braking force may be freely adjusted in accordance with the weight of a lure or fishing methods.

According to the invention in another aspect, in a centrifugal braking device for a dual-bearing reel, the, braking force may be minutely adjusted since at least one of the plurality of the shifters has a different braking characteristic. Also, an error in combining the shifters may be prevented when it is set that the shifters having different braking characteristic are attachable only to predetermined corresponding guide shafts.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. In a dual-bearing reel unit rotatively carrying a spool on its rotary shaft, a centrifugal braking device for braking the spool under centrifugal force, the dual-bearing reel centrifugal braking device comprising:

a cylindrical brake element rotationally restricted with respect to the reel unit;

a rotary member coupled with the spool for rotating therewith and allowed to shift relative to said brake element along the rotational axis of said spool;

a plurality of shifters each fitted for shifting on said rotary member, therein for shifting towards said brake element under centrifugal force due to rotation of the spool, wherein shifting said rotary member and said brake element relatively along the rotational axis enables differing numbers of said shifters to contact said brake element; and a shifting mechanism for shifting said brake element and said rotary member relatively along said rotational axis.

2. A dual-bearing reel centrifugal braking device as set forth in claim 1, further comprising a switching means for translating said shifters into different positions to switch at least any one of said plurality of shifters between an inoperative posture wherein contact on said brake element is not possible and an operative posture wherein contact is possible.

3. A dual-bearing reel centrifugal braking device as set forth in claim 2, wherein said plurality of shifters are fitted respectively to a plurality of guides radially disposed on said rotary member and oriented towards said brake element, therein allowed to shift spool-diametrically.

4. A dual-bearing reel centrifugal braking device as set forth in claim 3, wherein:

said guides include a plurality of guide shafts stood radially on said rotary member and oriented towards said brake element; and said plurality of shifters are respectively fitted to said guide shafts, axially along which the shifters are allowed to shift.

5. A dual-bearing reel centrifugal braking device as set forth in claim 4, wherein at least a portion of said plurality of guide shafts is stood on said rotary member in a position displaced along the rotational axis.

6. A dual-bearing reel centrifugal braking device as set forth in claim 5, wherein at least a portion of said plurality of shifters fitted to said guide shafts in locations wherein the rotational axis position is the same have contact portions whose contact positions along the rotational axis differ from the other shifters.

7. A dual-bearing reel centrifugal braking device as set forth in claim 5, wherein:

said shifters have body sections fitted to said guide shafts and contact sections provided on said the body sections for contact with said brake element; and said contact portions are in rotational axial length shorter than said body sections in rotational axial length.

8. A dual-bearing reel centrifugal braking device as set forth in claim 5, wherein:

said shifters have body sections attached to said guide shafts and contact sections provided on said body sections for contact with said brake element; and said contact portions are in rotational axial length shorter than said guide shafts are spaced apart along the rotational axis.

9. A dual-bearing reel centrifugal braking device as set forth in claim 4, wherein said switching means is enabled to switch said shifters between the two postures by shifting said shifters into different axial positions on said guide shafts.

10. A dual-bearing reel centrifugal braking device as set forth in claim 9, wherein:

said guide shafts are stood in recesses formed radially in said rotary member outer peripherally; and said switching means includes pairs of fixing projections formed projecting towards said shifters on rotationally opposing lateral walls of said recesses, and shifter projections formed on said shifters for interlocking with said pairs of fixing projections, wherein at least either said fixing projections or said shifter projections are elastic.

11. A dual-bearing reel centrifugal braking device as set forth in claim 10, wherein said rotary member further comprises stop projections arranged in a row diametrically outward of said fixing projections for interlocking with said shifter projections.

12. A dual-bearing reel centrifugal braking device as set forth in claim 3, wherein:

said guides include a plurality of guide surfaces provided on said rotary member oriented radially toward said brake element; and said plurality of shifters are respectively fitted to said guide surfaces, axially along which the shifters are allowed to shift.

13. A dual-bearing reel centrifugal braking device as set forth in claim 12, wherein said switching means is enabled to switch said shifters between the two postures by shifting said shifters into different spool-diametrical positions on said guide surfaces.

14. A dual-bearing reel centrifugal braking device as set forth in claim 12, wherein at least a portion of said plurality of guide surfaces is disposed on said rotary member in a position displaced along the rotational axis.

15. A dual-bearing reel centrifugal braking device as set forth in claim 1, wherein at least a portion of said plurality of shifters is disposed for contacting said brake element in a different position along the rotational axis.

16. A dual-bearing reel centrifugal braking device as set forth in claim 15, further comprising a plurality of pivotal shafts disposed circumferentially spaced on said rotary member, wherein said plurality of shifters are fitted respectively to and allowed to pivot about said pivotal shafts, respectively for contact with said brake element.

17. A dual-bearing reel centrifugal braking device as set forth claim 16, wherein said switching means is enabled to switch said shifters between the two postures by shifting said shifters into different pivotal positions.

18. A dual-bearing reel centrifugal braking device as set forth in claim 16, wherein at least a portion of the plurality of pivotal shafts is disposed on said rotary member in a position displaced along the rotational axis.

19. A dual-bearing reel centrifugal braking device as set forth in claim 1, wherein said shifting mechanism has a turner provided rotatively in the reel unit, and a rotary cam mechanism for shifting said brake element by converting turning of said turner into rotational axial shift.

20. A dual-bearing reel centrifugal braking device as set forth in claim 1, wherein said rotary member is non-rotatably provided on said spool.

21. A dual-bearing reel centrifugal braking device as set forth in claim 1, wherein said rotary member is non-rotatably provided on the rotary shaft of said spool.

22. A dual-bearing reel centrifugal braking as set forth in claim 1, wherein said brake element is axially movable relative to the reel unit, and said shifting mechanism moves said brake element relative to said rotary member.

23. A dual-bearing reel centrifugal braking device as set forth in claim 1, wherein said rotary member is axially movable relative to the reel unit, and said shifting mechanism moves said rotary member relative to said brake element.

24. In a dual-bearing reel unit rotatively carrying a spool on its rotary shaft, a centrifugal braking device for braking the spool under centrifugal force, the dual-bearing reel centrifugal braking device comprising:

a cylindrical brake element rotationally restricted with respect to the reel unit;

a rotary member coupled with the spool for rotating therewith a plurality of guides stood radially on said rotary member; and a plurality of shifters each fitted for shifting on said guide shafts, therein for shifting towards said brake element under centrifugal force due to rotation of the spool, said shifters having different braking characteristics that are exhibited when said shifters come into contact with said brake element, said plurality of guide shafts being of different types, each type corresponding to different braking characteristics of said plurality of shifters, such that each of said shifters can only fit to a guide shaft that is of the type corresponding to the brake characteristics of said shifter.

25. A dual-bearing reel centrifugal braking device as set forth in claim 24, wherein the braking characteristics of said shifters differ by a difference in mass of at least any one thereof.

26. A dual-bearing reel centrifugal braking device as set forth in claim 24, wherein the braking characteristics of said shifters differ by a difference in frictional coefficient of at least any one thereof.

27. A dual-bearing reel centrifugal braking device as set forth in claim 24, further comprising a switching means for translating said shifters into different positions to switch at least any one of said plurality of shifters between an inoperative posture wherein contact on said brake element is not possible and an operative posture wherein contact is possible.

28. A dual-bearing reel centrifugal braking device as set forth in claim 27, wherein said switching means is enabled to switch said shifters between the two postures by shifting said shifters into different axial positions on said guide shafts.

29. A dual-bearing reel centrifugal braking device for braking the spool under centrifugal force, the dual-bearing reel centrifugal braking device comprising:

a cylindrical brake element rotationally restricted with respect to the reel unit;

a rotary member coupled with the spool for rotating therewith;

a plurality of guides stood radially on said rotary member; and a plurality of shifters each fitted for shifting on said guide shafts, therein for shifting towards said brake element under centrifugal force due to rotation of the spool, wherein at least any one of said shifters differs in braking characteristics for coming into contact with said brake element, wherein said shifters differing in braking characteristics can be respectively fit only to corresponding said guide shafts, and said guide shafts differ in cross-sectional form correspondingly respectively to said shifters differing in braking characteristics.

30. A dual-bearing reel centrifugal braking device as set forth in claim 29, wherein said guide shafts are molded so that the cross-sectional form is asymmetrical with respect to a plane orthogonal to the rotational axis of the spool.

31. A dual-bearing reel centrifugal braking device as set forth in claim 30, wherein said guide shafts are molded so that the cross-sectional form is trapezoidal.

32. A dual-bearing reel centrifugal braking device as set forth in claim 29, wherein:

said brake element is allowed to shift along the rotational axis of said spool; and different numbers of said shifters are brought into contact with said brake element by shifting of said brake element in the axial direction.

* * * * *